United States Patent
Namima et al.

(10) Patent No.: US 12,148,319 B2
(45) Date of Patent: Nov. 19, 2024

(54) HUMAN BODY SIMULATION DEVICE

(71) Applicant: ASAHI INTECC CO., LTD., Seto (JP)

(72) Inventors: Satoshi Namima, Seto (JP); Yuta Kubo, Seto (JP); Erika Asahata, Seto (JP)

(73) Assignee: ASAHI INTECC CO., LTD., Seto (JP)

( * ) Notice: Subject to any disclaimer, the term of this patent is extended or adjusted under 35 U.S.C. 154(b) by 899 days.

(21) Appl. No.: 17/211,181

(22) Filed: Mar. 24, 2021

(65) Prior Publication Data
US 2021/0209968 A1 Jul. 8, 2021

Related U.S. Application Data

(63) Continuation of application No. PCT/JP2018/038674, filed on Oct. 17, 2018.

(51) Int. Cl.
G09B 23/30 (2006.01)
G09B 23/34 (2006.01)

(52) U.S. Cl.
CPC ........... G09B 23/303 (2013.01); G09B 23/34 (2013.01)

(58) Field of Classification Search
CPC ....... G09B 23/28; G09B 23/30; G09B 23/303
See application file for complete search history.

(56) References Cited

U.S. PATENT DOCUMENTS

| | | | | |
|---|---|---|---|---|
| 5,634,797 A * | 6/1997 | Montgomery | ......... | G09B 23/30 434/272 |
| 6,062,866 A * | 5/2000 | Prom | ..................... | G09B 23/28 434/262 |
| 7,427,199 B2 * | 9/2008 | Sakezles | ................ | G09B 23/28 434/267 |
| 10,127,838 B2 * | 11/2018 | Tassone | .................. | A61B 34/10 |
| 10,937,337 B2 * | 3/2021 | Okayama | ............... | G09B 23/34 |
| 11,238,755 B2 * | 2/2022 | Fiore | .................... | G09B 23/306 |
| 2003/0186203 A1 * | 10/2003 | Aboud | ................ | G09B 23/303 434/262 |
| 2009/0246747 A1 * | 10/2009 | Buckman, Jr. | ........ | G09B 23/285 434/272 |
| 2012/0288840 A1 | 11/2012 | Gurdin et al. | | |
| 2014/0370490 A1 * | 12/2014 | Iaizzo | .................. | A01N 1/0247 435/1.2 |
| 2016/0140878 A1 * | 5/2016 | Fernandez | ........... | G09B 23/303 434/268 |

(Continued)

FOREIGN PATENT DOCUMENTS

| | | |
|---|---|---|
| CN | 203786996 U | 8/2014 |
| CN | 106935093 A | 7/2017 |

(Continued)

*Primary Examiner* — Kurt Fernstrom
(74) *Attorney, Agent, or Firm* — Oliff PLC

(57) ABSTRACT

A human body simulation device includes an aorta model that simulates an aorta, and a biological model that simulates a part of a human body and has a partial blood vessel model simulating a part of blood vessels. The aorta model includes a biological model connecting portion that attachably/detachably connects the biological model in a state where an inner cavity of the aorta model and an inner cavity of the partial blood vessel model are in communication with each other, and a fluid feeding portion connecting portion that connects a fluid feeding portion for feeding a fluid into the inner cavities.

13 Claims, 24 Drawing Sheets

(56) References Cited

U.S. PATENT DOCUMENTS

2018/0108276 A1* 4/2018 Ishiyama ............. G09B 23/303

FOREIGN PATENT DOCUMENTS

| | | | | |
|---|---|---|---|---|
| CN | 107798980 A | 3/2018 | | |
| EP | 2 772 897 A1 | 9/2014 | | |
| JP | 2008-237304 A | 10/2008 | | |
| JP | 2013-029820 A | 2/2013 | | |
| JP | 2014170075 A | * 9/2014 | ........... | G09B 23/285 |
| JP | 2015-064487 A | 4/2015 | | |
| JP | 2017-040812 A | 2/2017 | | |

* cited by examiner

HUMAN BODY SIMULATION DEVICE

CROSS REFERENCE TO RELATED APPLICATION

This is a Continuation of PCT/JP2018/038674 filed Oct. 17, 2018. The disclosure of the prior application is hereby incorporated by reference herein in its entirety.

TECHNICAL FIELD

The disclosed embodiments relate to a human body simulation device.

BACKGROUND

Medical devices such as a catheter are used for minimally invasive treatment or inspection for a living body lumen such as a circulatory system and a digestive system. In addition, there are known devices and systems that allow operators such as surgeons to simulate a procedure using these medical devices. For example, Patent Literature 1 discloses a simulation system including an aorta model that simulates a patient's aorta having aortic aneurysm or aortic dissection and capable of simulating a stent graft insertion procedure using a catheter. On the other hand, for example, Patent Literature 2 discloses a cardiac simulation device including an expandable and contractible heart for training and capable of simulating a coronary artery bypass graft (CABG) procedure that is an ordinary open-heart surgery.

However, since the simulation system described in Patent Literature 1 does not have a biological model other than the aorta model, the system has had a problem in that the types of procedures that can be simulated using the simulation system are limited. In addition, for the cardiac simulation device described in Patent Literature 2, simulation of a procedure using a medical device for minimally invasive treatment or inspection, such as a catheter, is not taken into consideration.

CITATION LIST

Patent Literature

Patent Literature 1: Japanese Patent Laid-Open No. 2015-64487
Patent Literature 2: Japanese Patent Laid-Open No. 2017-40812

SUMMARY

The disclosed embodiments have been made to address the above problems, and an object of the disclosed embodiments is to provide a human body simulation device capable of simulating various procedures using medical devices for minimally invasive treatment or inspection.

The disclosed embodiments include the following aspects.

(1) One aspect of the disclosed embodiments makes it possible to provide a human body simulation device. This human body simulation device includes an aorta model that simulates an aorta, and a biological model that simulates a part of a human body and has a partial blood vessel model simulating a part of blood vessels. The aorta model includes a biological model connecting portion that attachably/detachably connects to the biological model in a state where an inner cavity of the aorta model and an inner cavity of the partial blood vessel model are in communication with each other, and a fluid feeding portion connecting portion that connects a fluid feeding portion for feeding a fluid into the inner cavities.

According to this configuration, in the human body simulation device, the biological model simulating a part of the human body is connected to the biological model connecting portion, so that it is possible to simulate various procedures using a medical device such as a catheter and a guide wire for a living body lumen of each organ according to the connected biological model, such as a circulatory system and a digestive system. In addition, since the biological model connecting portion can attachably/detachably connect to the biological model, the biological model can be detached and separately stored when not needed for the procedure, so that convenience can be improved.

(2) In the human body simulation device according to the aforementioned aspect, the biological model connecting portion may include at least two or more of a first connection portion for connecting a brain model simulating a brain, a second connection portion for connecting a heart model simulating a heart, a third connection portion for connecting a liver model simulating a liver, and a fourth connection portion for connecting a lower limb model simulating a lower limb. According to this configuration, since the biological model connecting portion includes at least two or more of the first to fourth connection portions, two or more of the brain model, the heart model, the liver model, and the lower limb model can be connected to the aorta model at the same time. As a result, for example, treatment or inspection for a plurality of blood vessels can be simulated in one human body simulation device.

(3) In the human body simulation device according to the aforementioned aspect, the aorta model may be configured such that the first connection portion is disposed on or near an aortic arch, the second connection portion is disposed on or near an ascending aorta, the third connection portion is disposed on or near an abdominal aorta, and the fourth connection portion is disposed on or near a common iliac aorta. According to this configuration, in the aorta model, since the first connection portion is disposed on or near the aortic arch, the second connection portion is disposed on or near the ascending aorta, the third connection portion is disposed on or near the abdominal aorta, and the fourth connection portion is disposed on or near the common iliac aorta, the brain model, the heart model, the liver model, and the lower limb model that are connected to the aorta model can be facilely disposed at positions of a brain, a heart, a liver, and lower limbs in an actual human body.

(4) In the human body simulation device according to the aforementioned aspect, the partial blood vessel model includes a plurality of blood vessel constituting portions that constitute each portion of the part of blood vessels, and at least a part of the plurality of blood vessel constituting portions may have a lesion portion simulating a lesion inside or outside the blood vessel. According to this configuration, the partial blood vessel model includes the plurality of blood vessel constituting portions, and at least a part of the plurality of blood vessel constituting portions has a lesion portion simulating a lesion. Thus, an operator can simulate a procedure (e.g. a procedure such as Percutaneous Coronary Intervention (PCI)) using a medical device such as a guide wire and a catheter for the lesion portion formed on the partial blood vessel model.

(5) In the human body simulation device according to the aforementioned aspect, the biological model connecting portion includes a first flange portion formed on an outer periphery of an opening leading to the inner cavity of the aorta model, the partial blood vessel model includes a second flange portion formed on an outer periphery of an opening leading to the inner cavity of the partial blood vessel model, and the biological model may be connected to the aorta model by fixing the first flange portion and the second flange portion to each other so as to be abutted against each other. According to this configuration, the first flange portion on the aorta model side and the second flange portion on the partial blood vessel model side are fixed to each other so as to be abutted against each other, so that the biological model can be easily connected to the aorta model.

(6) The human body simulation device according to the aforementioned aspect may additionally include a fixation member that fixes the first flange portion and the second flange portion to each other by engaging the fixation member to outer edges of the abutted first flange portion and second flange portion. According to this configuration, the first flange portion and the second flange portion can be easily fixed to each other by the fixation member that is engaged with the outer edges of the abutted first flange portion and second flange portion.

(7) In the human body simulation device according to the aforementioned aspect, the partial blood vessel model may be configured such that a proximal end can be connected to the biological model connecting portion and a distal end is arranged on at least one of a surface and an inside of the biological model. This configuration allows the partial blood vessel model arranged on the surface of the biological model to simulate e.g. a posterior cerebral artery of a brain, a left coronary artery and a right coronary artery of a heart, and the like. In addition, the partial blood vessel model arranged inside the biological model can simulate e.g. a middle cerebral artery of a brain, a hepatic artery of a liver, a femoral artery of a lower limb, and the like.

(8) In the human body simulation device according to the aforementioned aspect, the aorta model and the biological model connected to the aorta model may be contained in a water bath that can be filled with a liquid as the fluid. According to this configuration, since the aorta model and the biological model are contained in the water bath filled with the liquid, the aorta model and the biological model can be kept in a moist state like each part in an actual human body.

(9) In the human body simulation device according to the aforementioned aspect, the biological model is a heart model having an inner cavity and simulating a heart, and additionally includes a beat portion for causing the heart model to beat by sending and sucking an expansion medium into/from the inner cavity of the heart model. The expansion medium may be a radiolucent liquid. According to this configuration, the heart model can be caused to beat in the same manner as in an actual human body by the beat portion that sends and sucks the expansion medium into/from the inner cavity of the heart model. In addition, since the radiolucent liquid is used as the expansion medium in the beat portion, the expansion medium can be prevented from entering an angiographic image, so that an immersive feeling of a user can be improved.

Incidentally, the disclosed embodiments can be achieved in various manners, and can be achieved in aspects of e.g. a human body simulation device, a biological model such as a blood vessel model and an organ model, a method for controlling the human body simulation device, and the like.

DETAILED DESCRIPTION OF EMBODIMENTS

First Embodiment

Figure 1:
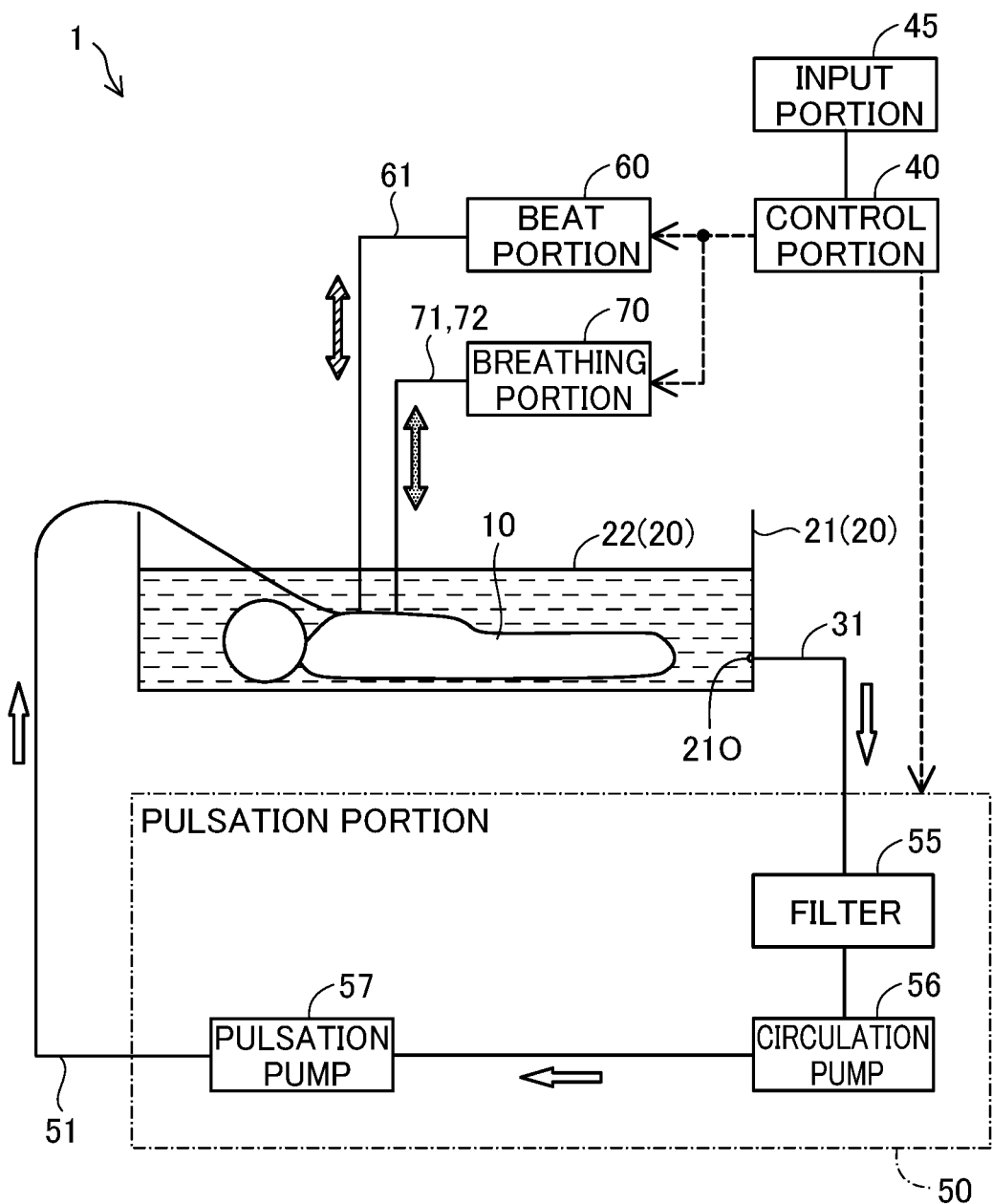
FIG. 1 is a diagram illustrating a schematic configuration of a human body simulation device according to the first embodiment.
Figure 2:
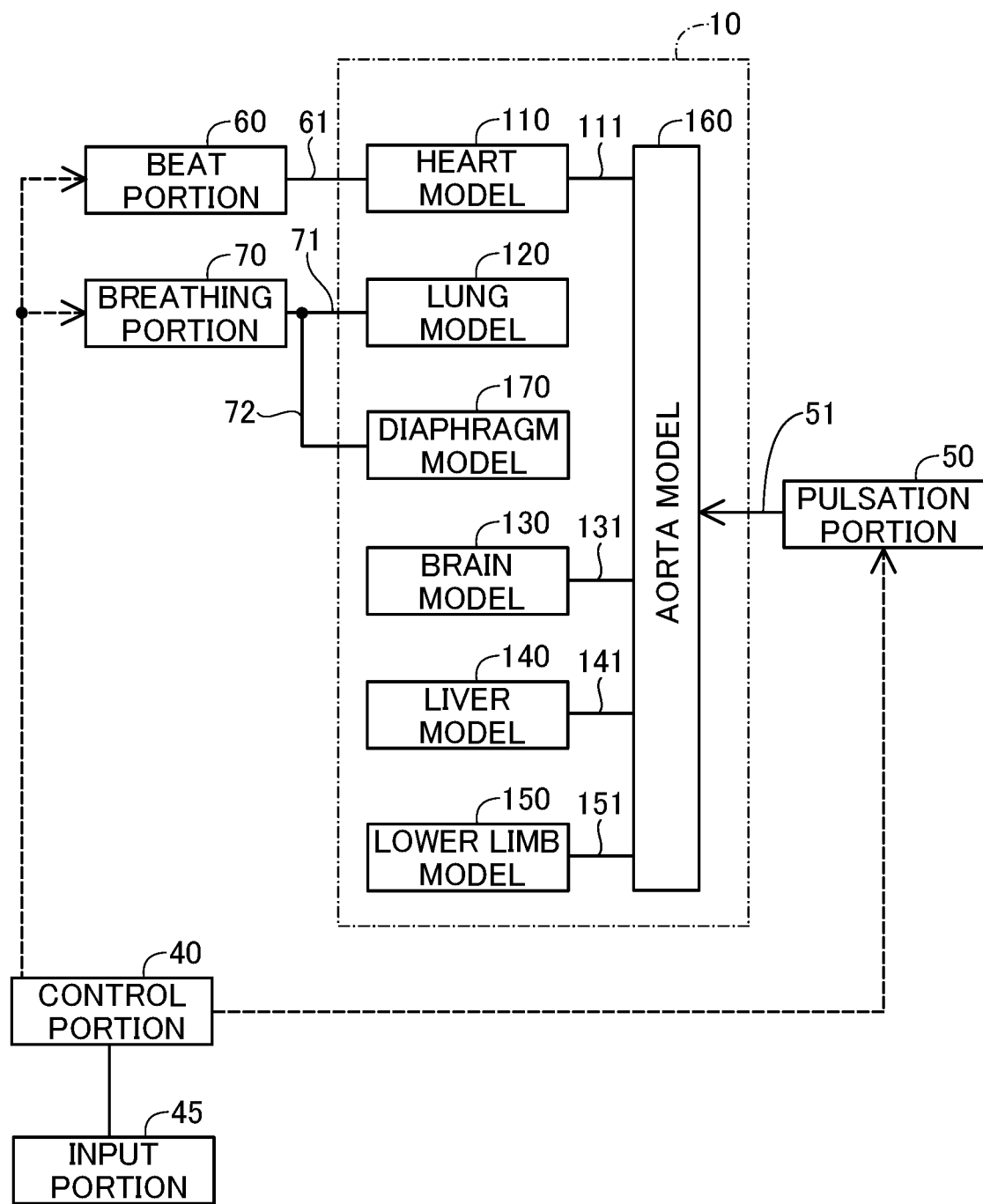
FIG. 2 is a diagram illustrating a schematic configuration of the human body simulation device according to the first embodiment.

FIG. 1 and FIG. 2 are diagrams illustrating a schematic configuration of a human body simulation device 1 according to the first embodiment. The human body simulation device 1 according to the first embodiment is used to simulate a treatment or inspection procedure using a medical device for minimally invasive treatment or inspection, such as a catheter and a guide wire in a living body lumen such as a circulatory system, a digestive system and a respiratory system of a human body. The human body simulation device 1 includes a model 10, an accommodation portion 20, a control portion 40, an input portion 45, a pulsation portion 50, a beat portion 60, and a breathing portion 70.

As illustrated in FIG. 2, the model 10 includes a heart model 110 simulating a human heart, a lung model 120 simulating a lung, a diaphragm model 170 simulating a diaphragm, a brain model 130 simulating a brain, a liver model 140 simulating a liver, a lower limb model 150 simulating a lower limb, and an aorta model 160 simulating an aorta. Hereinafter, the heart model 110, the lung model 120, the diaphragm model 170, the brain model 130, the liver model 140, and the lower limb model 150 are also collectively referred to as a "biological model". The lung model 120 and the diaphragm model 170 are also collectively referred to as a "respiratory organ model". Each biological model excluding the lung model 120 and the diaphragm model 170 is connected to the aorta model 160. The model 10 will be described in detail later.

The accommodation portion 20 includes a water bath 21 and a covering portion 22. The water bath 21 is a substantially rectangular parallelepiped water bath with an opening at the top. As illustrated in FIG. 1, when the model 10 is located on a bottom face of the water bath 21 while an inside of the water bath 21 is filled with a fluid, the model 10 is submerged in the fluid. Since water (liquid) is used as the fluid in the first embodiment, the model 10 can be maintained in a moist state like an actual human body. Incidentally, another liquid (e.g. physiological saline, an aqueous solution of an arbitrary compound, or the like) may be adopted as the fluid. The fluid charged in the water bath 21 is taken into the aorta model 160 and the like of the model 10 and functionally serves as a "simulation blood" that simulates blood.

The covering portion 22 is a plate-like member that covers the opening of the water bath 21. In a state that one side face of the covering portion 22 is brought into contact with the fluid and the other side face is brought into contact with outside air, the covering portion 22 is located on the water bath 21, and therefore the covering portion 22 functionally serves as a wave-dissipating plate. Thereby, it is possible to suppress decrease in visual recognizability due to waving of the fluid inside the water bath 21. Since the water bath 21 and the covering portion 22 according to the first embodiment are made of a synthetic resin having X-ray transparency and high transparency (e.g. acrylic resin), visual recognizability for the model 10 from the outside can be improved. Incidentally, the water bath 21 and the covering portion 22 may be made of another synthetic resin, and the water bath 21 and the covering portion 22 may be made of different materials.

The control portion 40 includes a central processing unit (CPU), a read-only memory (ROM), a random-access memory (RAM), and a storage portion that are not illustrated. A computer program stored in the ROM is developed to the RAM and executed, so that operations of the pulsation portion 50, the beat portion 60, and the breathing portion 70 are controlled (described in detail later). The input portion 45 refers to various interfaces used for the user to input information to the human body simulation device 1. As the input portion 45, for example, a touch panel, a keyboard, a manipulation button, a manipulation dial, a microphone, or the like can be adopted. Hereinafter, the touch panel will be illustrated as the input portion 45.

The pulsation portion 50 is a "fluid feeding portion" that sends the pulsated fluid into the aorta model 160. Specifically, as indicated by a white arrow in FIG. 1, the pulsation portion 50 circulates the fluid in the water bath 21 to feed the fluid to the aorta model 160 of the model 10. The pulsation portion 50 according to the first embodiment includes a filter 55, a circulation pump 56, and a pulsation pump 57. The filter 55 is connected to an opening 21O of the water bath 21 through a tubular body 31. The filter 55 filters the fluid passing through the filter 55 to remove impurities (e.g. contrast medium used in the procedure) in the fluid. The circulation pump 56 is e.g. a non-positive displacement type centrifugal pump, which circulates the fluid fed from the water bath 21 through the tubular body 31 at a constant flow rate.

The pulsation pump 57 is e.g. a positive displacement type reciprocating pump, which pulsates the fluid sent out from the circulation pump 56. The pulsation pump 57 is connected to the aorta model 160 of the model 10 through a tubular body 51 (FIG. 2). Thus, the fluid sent out from the pulsation pump 57 is fed to an inner cavity of the aorta model 160. Incidentally, as the pulsation pump 57, a rotary pump that is operated at a low speed may be used instead of the reciprocating pump. In addition, the filter 55 and the circulation pump 56 may be omitted. The tubular body 31 and the tubular body 51 are flexible tubes made of a synthetic resin (e.g. silicone or the like) that is an X-ray-transparent soft material.

The beat portion 60 causes the heart model 110 to beat. Specifically, as indicated by an arrow hatched by oblique lines in FIG. 1, the beat portion 60 expands the heart model 110 by sending the fluid into an inner cavity of the heart model 110, and contracts the heart model 110 by sucking out the fluid in the inner cavity of the heart model 110. The beat portion 60 repeats the sending and sucking to achieve beating (expansion and contraction) of the heart model 110. As the fluid used in the beat portion 60 (hereinafter, also referred to as "expansion medium"), a liquid may be used similarly to the simulation blood, or e.g. a gas such as air may be used. The expansion medium is preferably an organic solvent such as benzene and ethanol, or a radiolucent liquid such as water. The beat portion 60 can be achieved by using e.g. a positive displacement type reciprocating pump. The beat portion 60 is connected to the heart model 110 of the model 10 through a tubular body 61 (FIG. 2). The tubular body 61 is a flexible tube made of a synthetic resin (e.g. silicone or the like) that is an X-ray-transparent soft material.

The breathing portion 70 causes the lung model 120 and the diaphragm model 170 to simulate breathing. Specifically, as indicated by an arrow hatched by dots in FIG. 1, the breathing portion 70 expands the lung model 120 and contracts the diaphragm model 170 by sending the fluid into an inner cavity of the lung model 120 and the diaphragm model 170. In addition, the breathing portion 70 contracts the lung model 120 and relaxes the diaphragm model 170 by sucking the fluid from the inner cavity of the lung model 120 and the diaphragm model 170. The breathing portion 70 repeats the sending and sucking to achieve beating of the lung model 120 and the diaphragm model 170. As the fluid used in the breathing portion 70, a liquid may be used similarly to the simulation blood, or e.g. a gas such as air may be used. The breathing portion 70 can be achieved by using e.g. a positive displacement type reciprocating pump. The breathing portion 70 is connected to the lung model 120 of the model 10 through a tubular body 71, and connected to the diaphragm model 170 through a tubular body 72 (FIG. 2). The tubular bodies 71 and 72 are flexible tubes made of a synthetic resin (e.g. silicone or the like) that is an X-ray-transparent soft material.

Figure 3:
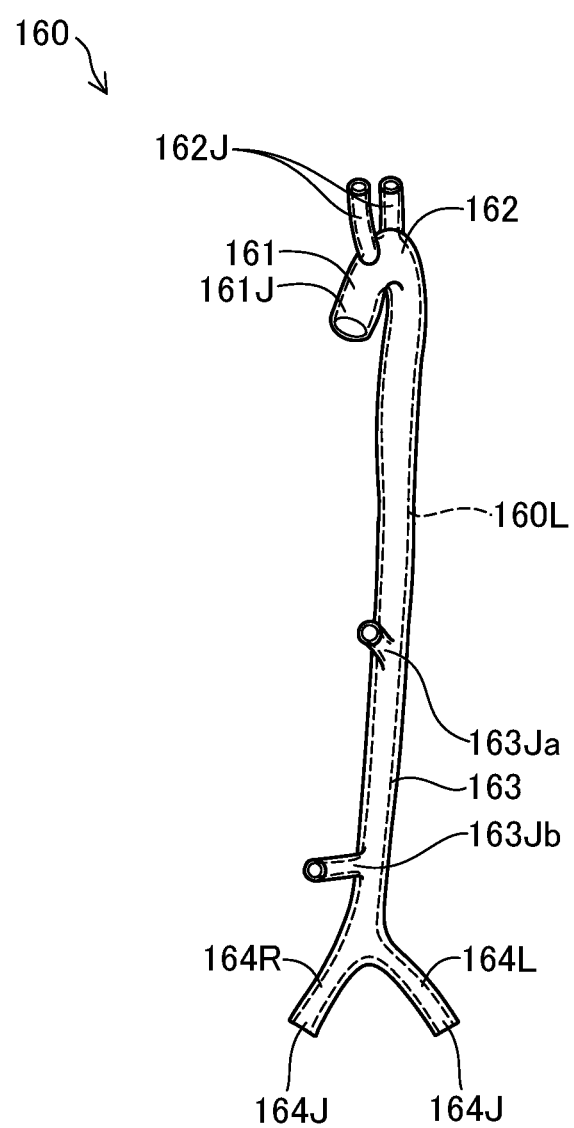
FIG. 3 is a diagram illustrating an example of a configuration of an aorta model.

FIG. 3 is a diagram illustrating an example of a configuration of the aorta model 160. The aorta model 160 is composed of each portion simulating a human aorta, i.e. an ascending aorta portion 161 simulating an ascending aorta, an aortic arch portion 162 simulating an aortic arch, an abdominal aorta portion 163 simulating an abdominal aorta, and a common iliac aorta portion 164R, 164L simulating a common iliac aorta.

The aorta model 160 includes a second connection portion 161J for connecting the heart model 110 on an end portion of the ascending aorta portion 161. Similarly, the aorta model 160 includes a first connection portion 162J for connecting the brain model 130 in the vicinity of the aortic arch portion 162, a third connection portion 163Ja for connecting the liver model 140 in the vicinity of the abdominal aorta portion 163, and two fourth connection portions 164J for connecting the right and left lower limb models 150 on an end portion of the common iliac aorta portion 164R, 164L. Incidentally, the second connection portion 161J only needs to be disposed on or near the ascending aorta portion 161, and the fourth connection portion 164J only needs to be disposed on or near the common iliac aorta portion 164R, 164L. Hereinafter, these first to fourth connection portions 161J to 164J are also collectively referred to as a "biological model connecting portion". In addition, the aorta model 160 includes a fluid feeding portion connecting portion 163Jb for connecting the pulsation portion 50 in the vicinity of the abdominal aorta portion 163. Incidentally, the fluid feeding portion connecting portion 163Jb may be disposed not only in the vicinity of the abdominal aorta portion 163 but also at any position such as the vicinity of the ascending aorta portion 161 and a vicinity of a cerebral vessel model 131 (e.g. common carotid artery). In addition, the aorta model 160 may include a plurality of the fluid feeding portion connecting portions 163Jb disposed at different positions.

In addition, in the aorta model 160, opening inner cavities 160L are formed on each of the aforementioned biological model connecting portions and fluid feeding portion connecting portions (first connection portion 162J, second connection portion 161J, third connection portion 163Ja, two fourth connection portions 164J, and fluid feeding portion connecting portion 163Jb). The inner cavity 160L functionally serves as a flow passage for transporting the simulation blood (fluid) fed from the pulsation portion 50 to the heart model 110, the brain model 130, the liver model 140, and the lower limb model 150.

The aorta model 160 according to the first embodiment is made of a synthetic resin (e.g. polyvinyl alcohol (PVA), silicone, or the like) that is an X-ray-transparent soft material. In particular, it is preferable to use a PVA in that a tactile sensation of the aorta model 160 submerged in the liquid can resemble a tactile sensation of an actual human aorta by hydrophilicity of the PVA.

The aorta model 160 can be produced e.g. in the following manner. First, a mold that simulates a shape of the human aorta is prepared. Among human body model data generated by analyzing a computed tomography (CT) image, a magnetic resonance imaging (MRI) image, or the like of an actual human body, data of a part corresponding to an aorta is input into e.g. a 3D printer and printed out, to produce the mold. The mold may be made of a plaster, a metal, or a resin. Subsequently, a liquefied synthetic resin material is applied inside the prepared mold, and after the synthetic resin material is cooled and solidified, the resin is released from the mold. In this way, the aorta model 160 having the inner cavity 160L can be easily produced.

Figure 4:
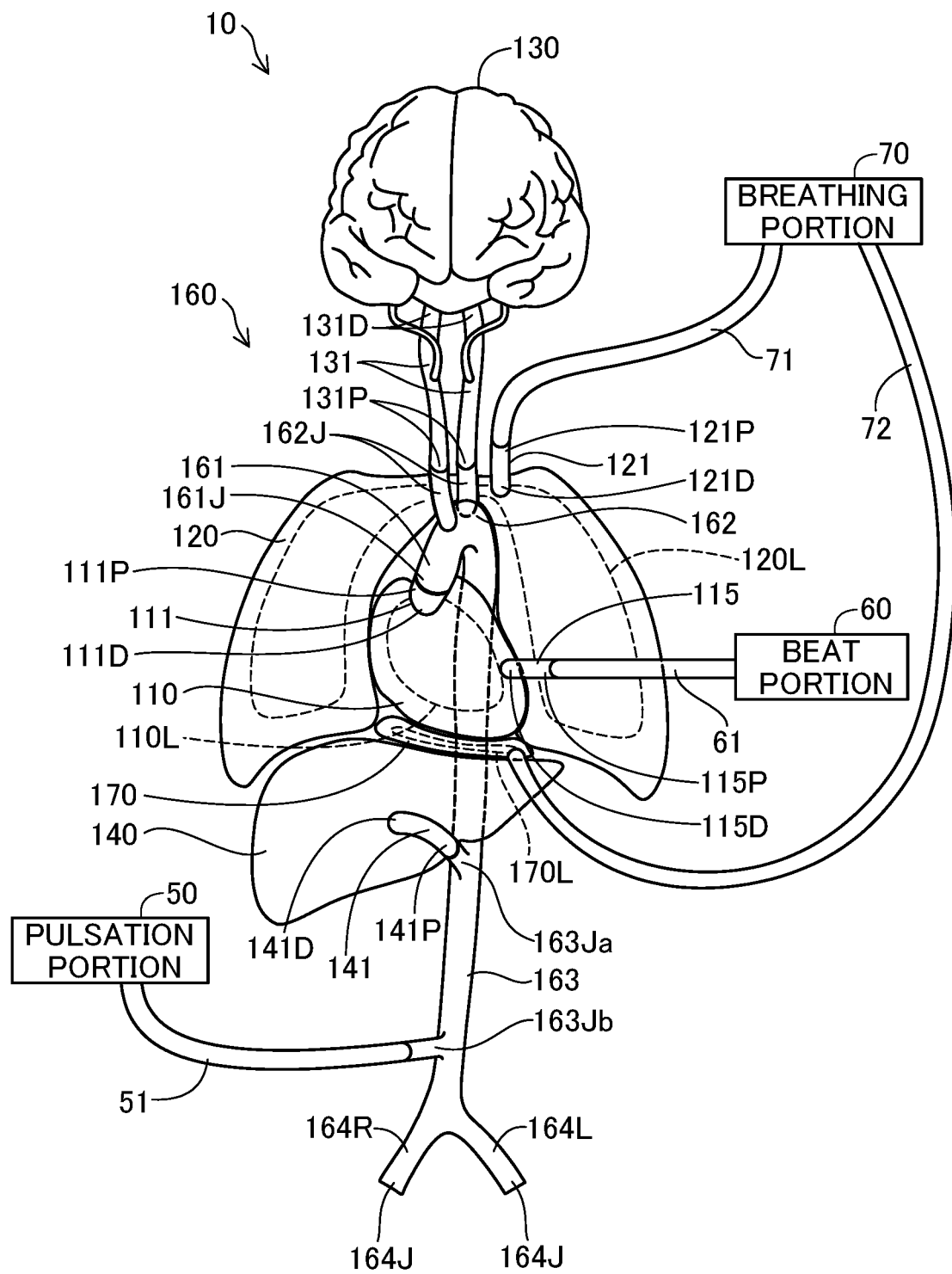
FIG. 4 is a diagram illustrating an example of a configuration of a model.
Figure 5:
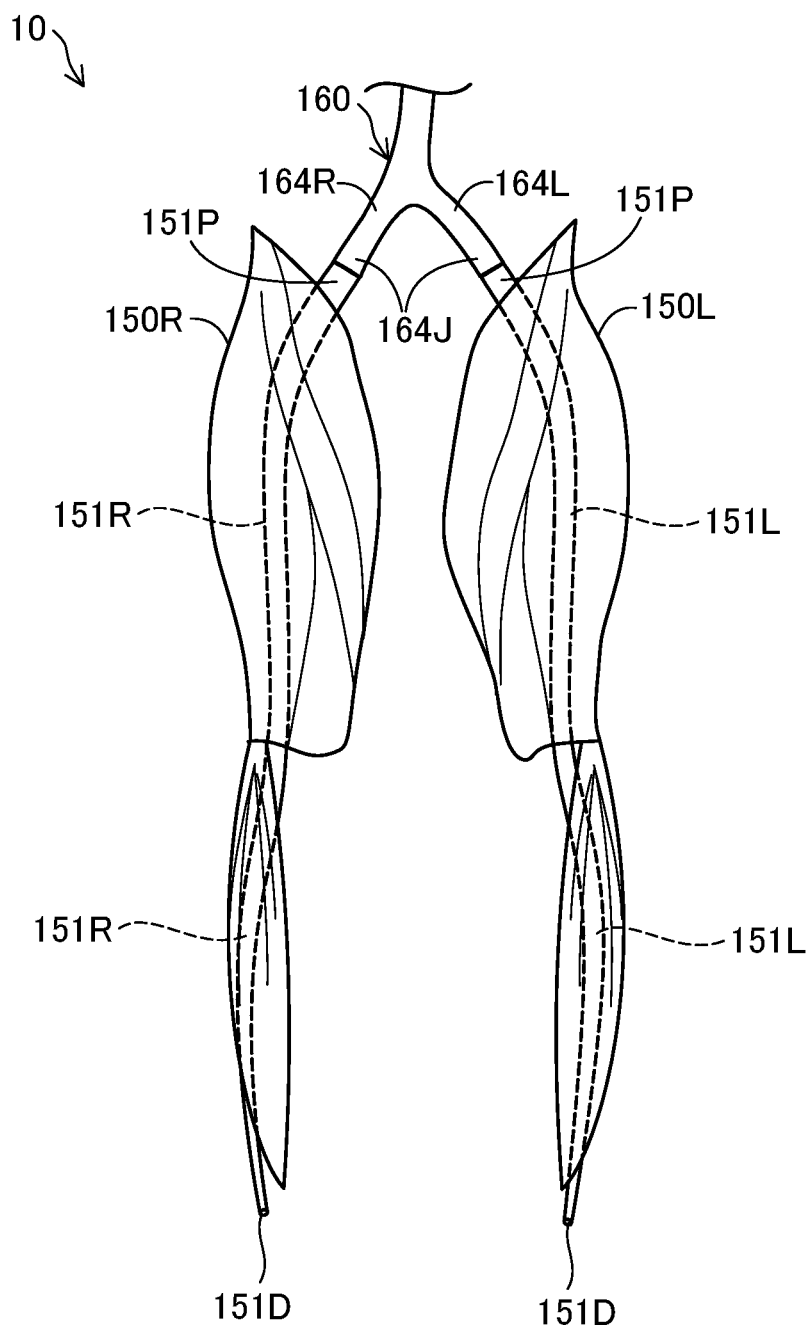
FIG. 5 is a diagram illustrating an example of a configuration of the model.
Figure 6:
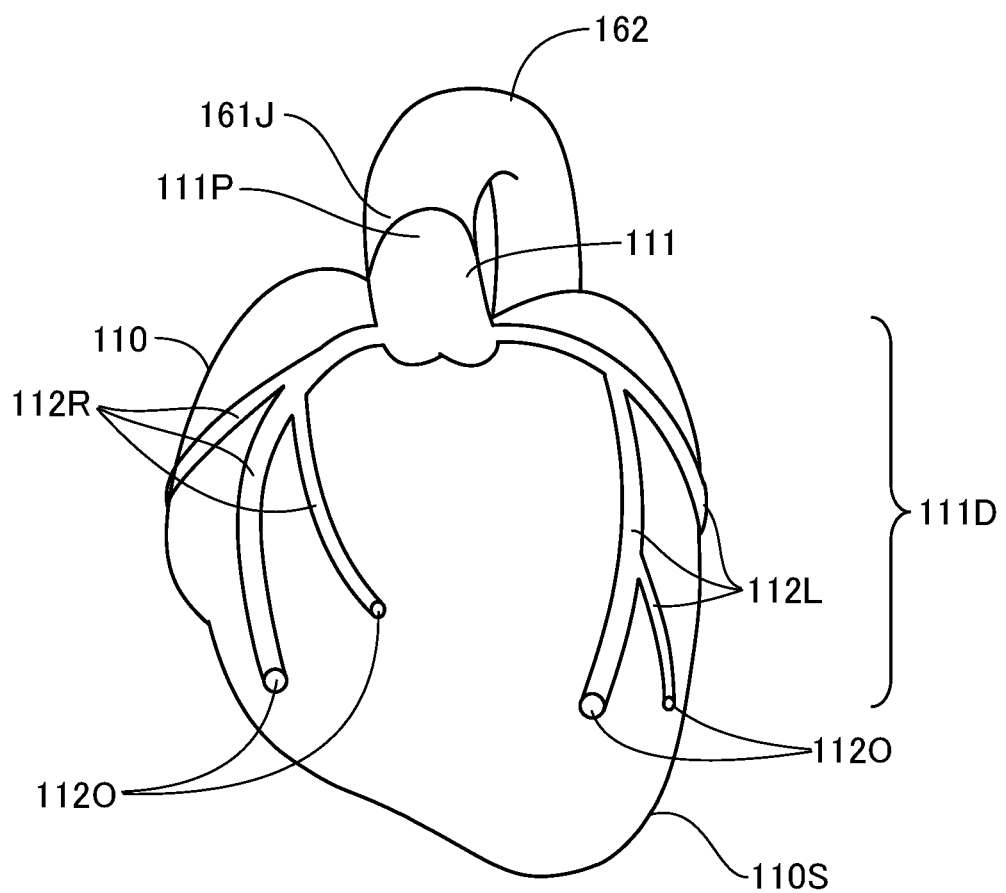
FIG. 6 is a diagram illustrating an example of a heart model.

FIG. 4 and FIG. 5 are diagrams illustrating an example of a configuration of the model 10. FIG. 6 is a diagram illustrating an example of the heart model 110. As illustrated in FIG. 4, the heart model 110 has a shape simulating a heart, and includes an inner cavity 110L thereinside. The heart model 110 according to the first embodiment is made of a synthetic resin (e.g. silicone or the like) that is an X-ray-transparent soft material, and can be formed by applying the synthetic resin material inside the mold produced from the human body model data and releasing the resin from the mold, similarly to the aorta model 160. In addition, the heart model 110 includes a cardiac vessel model 111 and a tubular body 115. Incidentally, in FIG. 6, illustration of the inner cavity 110L and the tubular body 115 of the heart model 110 is omitted.

The cardiac vessel model 111 is a tubular blood vessel model simulating a part of an ascending aorta and a coronary artery, and is made of a synthetic resin (e.g. PVA, silicone, or the like) that is an X-ray-transparent soft material. As illustrated in FIG. 6, a proximal end 111P of the cardiac vessel model 111 is connected to the second connection portion 161J of the aorta model 160. Herein, the proximal end 111P of the cardiac vessel model 111 is connected to the second connection portion 161J such that an inner cavity 111L of the cardiac vessel model 111 and the inner cavity 160L of the aorta model 160 communicate with each other. In addition, as illustrated in FIG. 6, a distal end 111D of the cardiac vessel model 111 is branched into a tubular right coronary artery model 112R simulating a right coronary artery and a tubular left coronary artery model 112L simulating a left coronary artery, and each of the branches is arranged on a surface 110S of the heart model 110.

A distal end portion of each branch of the left and right coronary artery models 112L and 112R has an opening 112O through which the fluid fed from the aorta model 160 (inner cavity 160L) through the cardiac vessel model 111 (inner cavity 111L) is discharged to the outside (inside the water bath 21). Incidentally, the right and left coronary artery models 112R, 112L may or may not include an opening 112O. The tubular body 115 is a flexible tube made of a synthetic resin (e.g. silicone or the like) that is an X-ray-transparent soft material. The tubular body 115 has a distal end 115D communicatively connected to the inner cavity 110L of the heart model 110, and a proximal end 115P communicatively connected to the tubular body 61 leading to the beat portion 60.

The lung model 120 (FIG. 4) has a shape simulating a right lung and a left lung. Inside the lung model 120, one inner cavity 120L in which the right lung and the left lung communicate with each other is formed. The lung model 120 is disposed so as to cover the right and left sides of the heart model 110. A material and a production method that can be adopted to produce the lung model 120 are the same as those for the heart model 110. The material of the lung model 120 and the material of the heart model 110 may be the same or different. In addition, the lung model 120 includes a trachea model 121 that is a tubular model simulating a part of a trachea. The trachea model 121 can be made of the same material as of the tubular body 115 of the heart model 110. The material of the trachea model 121 and the material of the tubular body 115 may be the same or different. The trachea model 121 has a distal end 121D communicatively connected to the inner cavity 120L of the lung model 120, and a proximal end 121P communicatively connected to the tubular body 71 leading to the breathing portion 70.

The diaphragm model 170 (FIG. 4) has a shape simulating a diaphragm, and includes an inner cavity 170L thereinside. The diaphragm model 170 is disposed under the heart model 110 (in other words, opposite to the brain model 130 with the heart model 110 therebetween). A material and a production method that can be adopted to produce the diaphragm model 170 are the same as those for the heart model 110. The material of the diaphragm model 170 and the material of the heart model 110 may be the same or different. In addition, the diaphragm model 170 is connected with the tubular body 72 leading to the breathing portion 70 such that the inner cavity 170L of the diaphragm model 170 and the inner cavity of the tubular body 72 communicate with each other.

The brain model 130 (FIG. 4) has a shape simulating a brain and is solid with no inner cavity. The brain model 130 is disposed above the heart model 110 (in other words, opposite to the diaphragm model 170 with the heart model 110 therebetween). A material and a production method that can be adopted to produce the brain model 130 are the same as those for the heart model 110. The material of the brain model 130 and the material of the heart model 110 may be the same or different. In addition, the brain model 130 includes the cerebral vessel model 131 that is a tubular blood vessel model simulating at least a part of major arteries including from a pair of right and left common carotid arteries to a pair of right and left vertebral arteries. The cerebral vessel model 131 can be made of the same material as of the cardiac vessel model 111 of the heart model 110. The material of the cerebral vessel model 131 and the material of the cardiac vessel model 111 may be the same or different. In addition, although not illustrated, the cerebral vessel model 131 may simulate not only arteries but also major veins including a superior cerebral vein and a straight sinus.

Incidentally, the brain model 130 may be a complex additionally including a bone model simulating a human cranium and cervical spine. For example, the cranium has a hard resin case simulating a parietal bone, a temporal bone, an occipital bone, and a sphenoid bone, and a lid simulating a frontal bone. The cervical spine may have a plurality of rectangular resin bodies having a through hole through which the blood vessel model can pass. When including a bone model, the bone model is made of a resin having a hardness different from that of an organ model such as a blood vessel model and a brain model, and for example, the cranium can be made of an acrylic resin and the vertebra can be made of a PVA.

The cerebral vessel model 131 has a distal end 131D connected to the brain model 130 and a proximal end 131P connected to the first connection portion 162J of the aorta model 160 (e.g. connected to a human brachiocephalic artery, subclavian artery, or the vicinity thereof). Herein, similarly to the cardiac vessel model 111, the distal end 131D of the cerebral vessel model 131 may simulate a vertebral artery passing through a vertebra and other vessels arranged on a surface and/or inside of the brain model 130 (e.g. posterior cerebral artery, middle cerebral artery), and further may simulate a posterior communicating artery so as to be connected with a common carotid artery peripheral part. In addition, the proximal end 131P of the cerebral vessel model 131 is connected to the first connection portion 162J such that the inner cavity of the cerebral vessel model 131 and the inner cavity 160L of the aorta model 160 communicate with each other.

The liver model 140 (FIG. 4) has a shape simulating a liver and is solid with no inner cavity. The liver model 140 is disposed under the diaphragm model 170. A material and a production method that can be adopted to produce the liver model 140 are the same as those for the heart model 110. The material of the liver model 140 and the material of the heart model 110 may be the same or different. In addition, the liver model 140 includes a hepatic vessel model 141 that is a tubular blood vessel model simulating a part of a hepatic artery. The hepatic vessel model 141 can be made of the same material as of the cardiac vessel model 111 of the heart model 110. The material of the hepatic vessel model 141 and the material of the cardiac vessel model 111 may be the same or different.

The hepatic vessel model 141 has a distal end 141D connected to the liver model 140 and a proximal end 141P connected to the third connection portion 163Ja of the aorta model 160. Herein, similarly to the cardiac vessel model 111, the distal end 141D of the hepatic vessel model 141 may simulate other blood vessels (e.g. hepatic artery) arranged on the surface and/or inside of the liver model 140. In addition, the proximal end 141P of the hepatic vessel model 141 is connected to the third connection portion 163Ja such that the inner cavity of the hepatic vessel model 141 and the inner cavity 160L of the aorta model 160 communicate with each other.

The lower limb model 150 (FIG. 5) includes a lower limb model 150R corresponding to a right leg and a lower limb model 150L corresponding to a left leg. Since the lower limb models 150R and 150L have the same configuration except that they are symmetrical, hereinafter they will be explained as the "lower limb model 150" without distinction. The lower limb model 150 has a shape simulating at least a part of major tissues such as a quadriceps muscle of a femur, and a tibialis anterior muscle, a peroneus longus muscle and an extensor digitorum longus muscle of a crus, and is solid with no inner cavity. A material and a production method that can be adopted to produce the lower limb model 150 are the same as those for the heart model 110. The material of the lower limb model 150 and the material of the heart model 110 may be the same or different. In addition, the lower limb model 150 includes a lower limb vessel model 151 (lower limb vessel models 151R and 151L) that is a tubular blood vessel model simulating at least a part of major arteries including from a femoral artery to a dorsalis pedis artery. The lower limb vessel model 151 can be made of the same material as of the cardiac vessel model 111 of the heart model 110. The material of the lower limb vessel model 151 and the material of the cardiac vessel model 111 may be the same or different. In addition, although not illustrated, the lower limb vessel model 151 may simulate not only arteries but also major veins including from a common iliac vein to a greater saphenous vein.

The lower limb vessel model 151 is disposed so as to extend along an extension direction from the femur to the crus side in the lower limb model 150. The lower limb vessel model 151 has a distal end 151D exposed from the lower end of the lower limb model 150 (position corresponding to a part from a tarsus portion to a dorsum pedis portion), and a proximal end 151P connected to the fourth connection portion 164J of the aorta model 160. Herein, the proximal end 151P is connected to the fourth connection portion 164J such that an inner cavity of the lower limb vessel model 151 and the inner cavity 160L of the aorta model 160 communicate with each other.

Incidentally, the aforementioned cardiac vessel model 111, cerebral vessel model 131, hepatic vessel model 141, and lower limb vessel model 151 are also collectively referred to as a "partial blood vessel model". In addition, the partial blood vessel model and the aorta model 160 are also collectively referred to as a "blood vessel model". Such a configuration allows the partial blood vessel model arranged on the surface of each biological model to simulate e.g. a posterior cerebral artery of a brain, a left coronary artery and a right coronary artery of a heart, and the like. In addition, the partial blood vessel model arranged inside each biological model can simulate e.g. a middle cerebral artery of a brain, a hepatic artery of a liver, a femoral artery of a lower limb, and the like.

Figure 7:
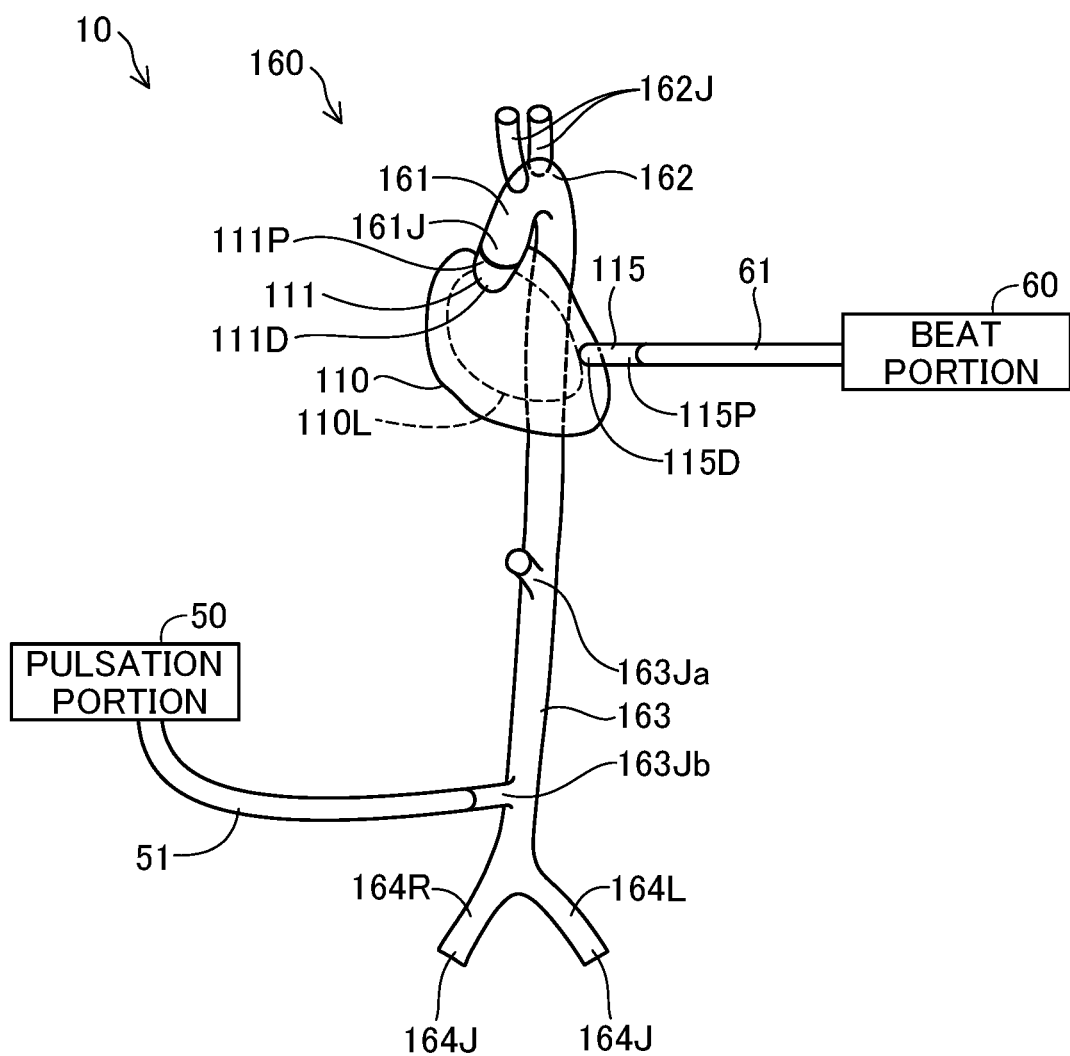
FIG. 7 is an explanatory diagram illustrating an example of a configuration of the model.

FIG. 7 is an explanatory diagram illustrating an example of a configuration of the model 10. In the human body simulation device 1 according to the first embodiment, at least one or more biological models (heart model 110, lung model 120, diaphragm model 170, brain model 130, liver model 140, lower limb model 150) are attached to or detached from the aorta model 160, so that the models 10 in various manners can be configured. In the example of FIG. 7, the model 10 is configured such that only the heart model 110 is attached to the aorta model 160, and the other biological models (lung model 120, diaphragm model 170, brain model 130, liver model 140, lower limb model 150) are detached. In addition, the model 10 is connected with a pulsation portion 50 for sending the simulation blood into the aorta model 160, and a beat portion 60 for causing the heart model 110 to beat. For example, when using the human body simulation device 1 to simulate a cardiac catheter treatment or inspection procedure such as Percutaneous Coronary Intervention (PCI) for ischemic heart disease, the model 10 in the manner illustrated in FIG. 7 may be used.

Figure 8:
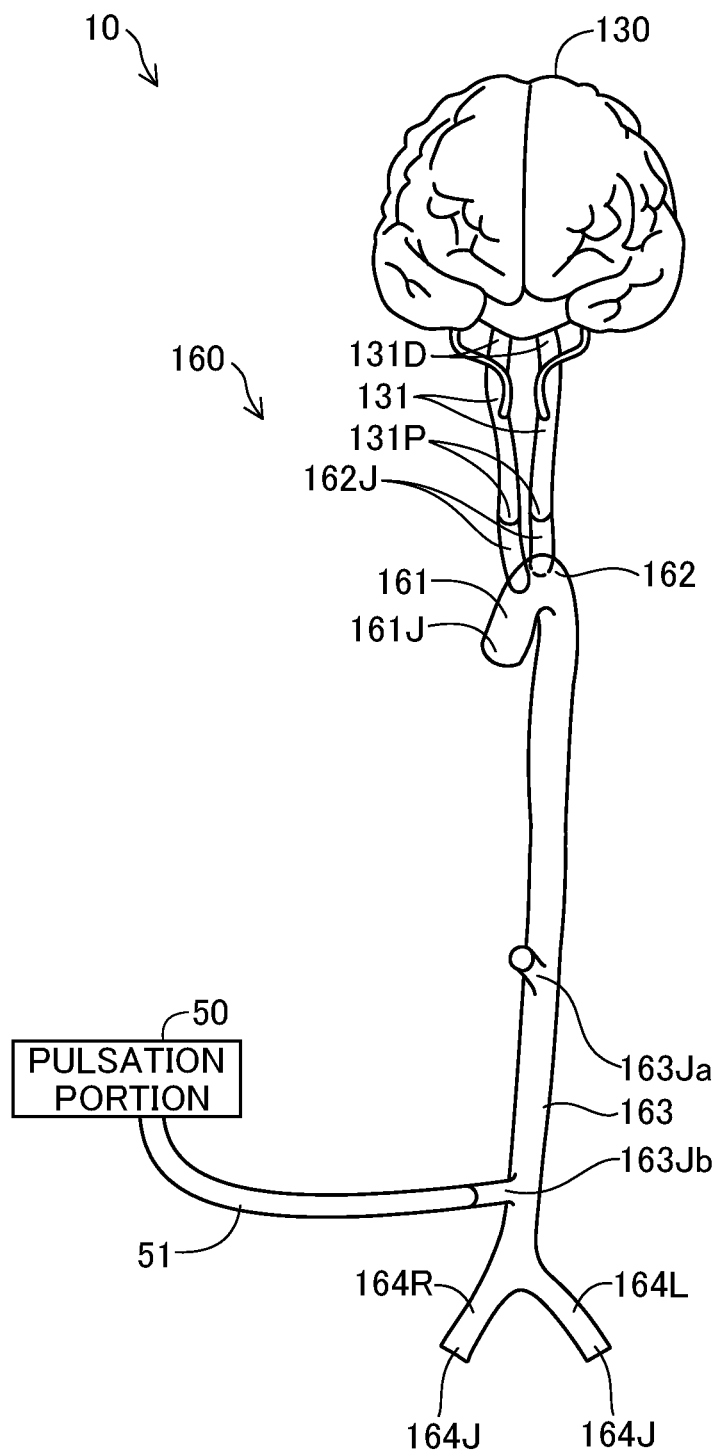
FIG. 8 is an explanatory diagram illustrating another example of a configuration of the model.

FIG. 8 is an explanatory diagram illustrating another example of a configuration of the model 10. In the example of FIG. 8, the model 10 is configured such that only the brain model 130 is attached to the aorta model 160, and the other biological models (heart model 110, lung model 120, diaphragm model 170, liver model 140, lower limb model 150) are detached. In addition, the model 10 is connected with the pulsation portion 50 for sending the simulation blood into the aorta model 160. For example, when using the human body simulation device 1 to simulate a cerebrovascular catheter treatment or inspection procedure such as coil embolization for a cerebral aneurysm, the model 10 in the manner illustrated in FIG. 8 may be used.

Note that the models illustrated in FIG. 7 and FIG. 8 are merely examples of the model 10. The combination of the biological models (heart model 110, lung model 120, diaphragm model 170, brain model 130, liver model 140, lower limb model 150) to be attached to the aorta model 160 can be freely changed depending on an organ required for a procedure. For example, when configuring the model 10 to which the heart model 110 and the lower limb model 150 are attached, a Trans-Femoral Intervention (TFI) procedure of PCI can be simulated using the human body simulation device 1. Additionally, for example, all biological models excluding the lower limb model 150 may be attached to the model 10, the heart model 110 and the lung model 120 may be attached to the model 10, the lung model 120 and the diaphragm model 170 may be attached to the model 10, only the liver model 140 may be attached to the model 10, or only the lower limb model 150 may be attached to the model 10.

As described above, in the human body simulation device 1 according to the first embodiment, the biological model connecting portion (first connection portion 162J, second connection portion 161J, third connection portion 163Ja, fourth connection portion 164J) is connected with the biological model simulating a part of a human body (heart model 110, brain model 130, liver model 140, lower limb model 150), so that it is possible to simulate various procedures using a medical device such as a catheter and a guide wire for a living body lumen of each organ according to the connected biological model, such as a circulatory system and a digestive system. In addition, since the biological model connecting portions 161J to 164J can connect with the biological models in an attachable/detachable manner, a biological model that is unnecessary for the procedure can be detached and separately stored, so that convenience can be improved.

In addition, when the human body simulation device 1 according to the first embodiment is connected with a biological model related to a respiratory system (lung model 120, diaphragm model 170), an operation of the respiratory system can affect other biological models (heart model 110, brain model 130, Liver model 140, lower limb model 150), and therefore it is possible to simulate the procedure under a more practical environment.

Furthermore, in the human body simulation device 1 according to the first embodiment, since the biological model connecting portion includes four types of connection portions (first connection portion 162J, second connection portion 161J, third connection portion 163Ja, fourth connection portion 164J), two or more of the heart model 110, the brain model 130, the liver model 140, and the lower limb model 150 can be simultaneously connected to the aorta model 160. As a result, for example, treatment or inspection for the plurality of blood vessels can be simulated in one human body simulation device 1.

Furthermore, as for the human body simulation device 1 according to the first embodiment, in the aorta model 160, the first connection portion 162J is disposed on or near an aortic arch (aortic arch portion 162), the second connection portion 161J is disposed on or near an ascending aorta (ascending aorta portion 161), the third connection portion 163Ja is disposed on or near an abdominal aorta (abdominal aorta portion 163), the fourth connection portion 164J is disposed on or near a common iliac aorta (common iliac aorta portion 164R, 164L), and therefore the brain model 130, heart model 110, liver model 140, and lower limb model 150 that are connected to the aorta model 160 can be facilely disposed at positions of the brain, heart, liver, and lower limbs in an actual human body.

Furthermore, in the human body simulation device 1 according to the first embodiment, the heart model 110 can be caused to beat in the same manner as an actual heart by the beat portion 60 that sends and sucks the expansion medium into/from the inner cavity of the heart model 110. In addition, when a radiolucent liquid is used as the expansion medium in the beat portion 60, the expansion medium can be prevented from entering an angiographic image, so that an immersive feeling of the user can be improved.

Figure 9:
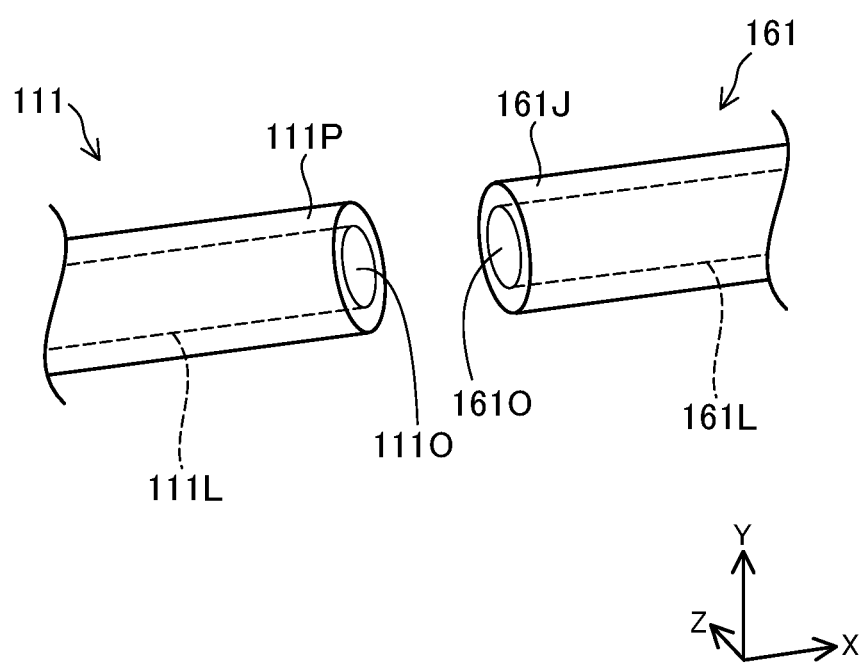
FIG. 9 is a diagram for explaining an example of a biological model connecting portion.

FIG. 9 is a diagram for explaining an example of a biological model connecting portion. In FIG. 9, XYZ axes that are orthogonal to each other are illustrated. The second connection portion 161J as the biological model connecting portion is disposed on the end portion of the ascending aorta portion 161 and includes an opening 161O leading to an inner cavity 161L of the ascending aorta portion 161. Similarly, the cardiac vessel model 111 as the partial blood vessel model is disposed on the end portion (proximal end 111P) of the cardiac vessel model 111 and includes an opening 111O leading to the inner cavity 111L of the cardiac vessel model 111. In this case, when connecting the heart model 110 to the aorta model 160, the second connection portion 161J and the cardiac vessel model 111 are fixed to each other using a fixture (not illustrated) such as a clip, in a state that an end face of the second connection portion 161J and an end face of the cardiac vessel model 111 are abutted against each other and the inner cavity 161L and the inner cavity 111L communicate with each other. Thereby, the heart model 110 can be connected to the aorta model 160, so that the fluid flowing through the inner cavity 160L of the aorta model 160 can be fed to the inner cavity 111L of the cardiac vessel model 111.

Incidentally, in FIG. 9, the second connection portion 161J is illustrated as an example of the biological model connecting portion, and the cardiac vessel model 111 is illustrated as an example of the partial blood vessel model. However, the same configuration can be adopted for the other biological model connecting portions (first connection portion 162J, third connection portion 163Ja, fourth connection portion 164J), the fluid feeding portion connecting portion 163Jb, the other partial blood vessel models (cerebral vessel model 131, hepatic vessel model 141, lower limb vessel model 151), and the trachea model 121.

Figure 10:
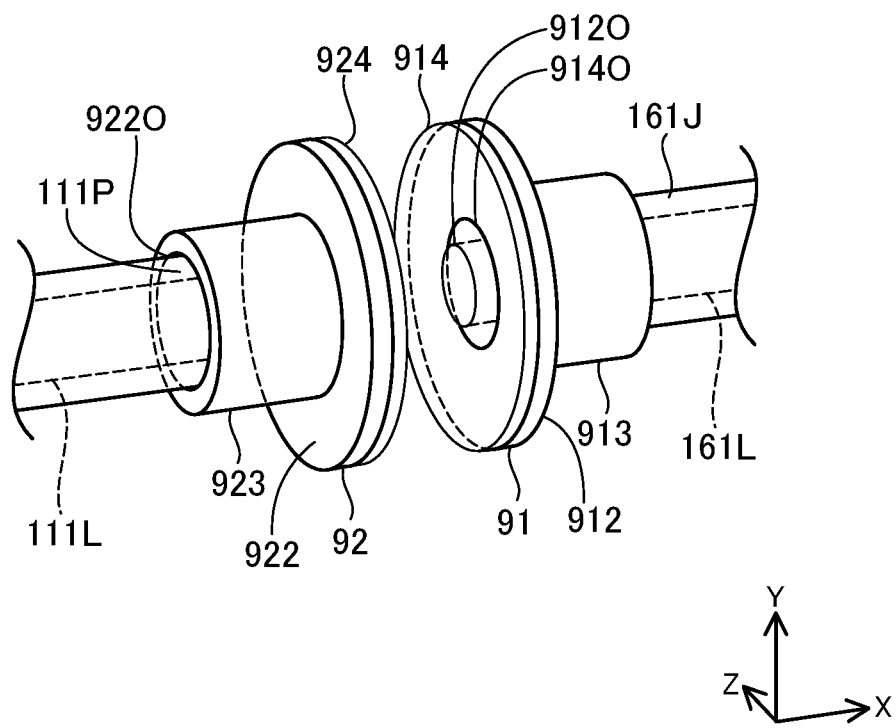
FIG. 10 is a diagram for explaining another example of the biological model connecting portion.
Figure 11:
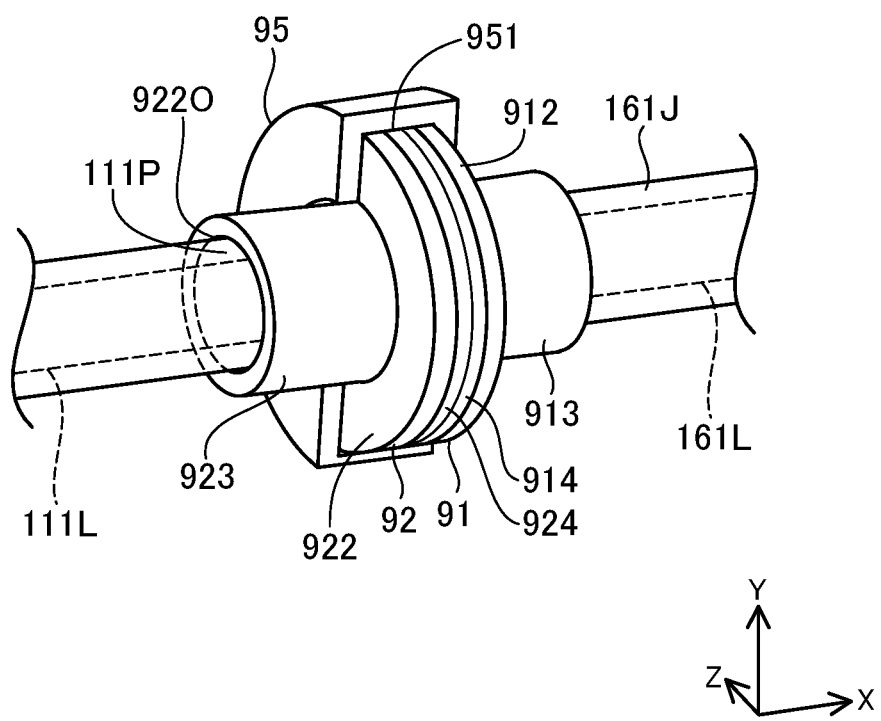
FIG. 11 is a diagram for explaining another example of the biological model connecting portion.

FIG. 10 and FIG. 11 are diagrams for explaining another example of the biological model connecting portion. XYZ axes in FIG. 10 and FIG. 11 correspond to the XYZ axes respectively in FIG. 9. The second connection portion 161J as the biological model connecting portion additionally includes a first flange portion 91 formed on an outer periphery of the opening 161O leading to the inner cavity 161L of the ascending aorta portion 161 (aorta model 160). The first flange portion 91 has a cylindrical body 913 that covers a surface of the ascending aorta portion 161 along an extension direction (X-axis direction) of the ascending aorta portion 161, and a disk member 912 disposed on an opening 161O-side end portion of the cylindrical body 913 and extending in the YZ directions. An opening (through hole) 912O communicating with the inner cavity 161L is formed substantially in the center of the disk member 912.

Similarly, the cardiac vessel model 111 as the partial blood vessel model further includes a second flange portion 92 formed on an outer periphery of the opening 111O leading to the inner cavity 111L of the cardiac vessel model 111. The second flange portion 92 has a cylindrical body 923 that covers a surface of the cardiac vessel model 111 along an extension direction (X-axis direction) of the cardiac vessel model 111, and a disk member 922 disposed on an opening 111O-side end portion of the cylindrical body 923 and extending in the YZ directions. An opening (through hole) 922O communicating with the opening 111O is formed substantially in the center of the disk member 922.

Figure 12:
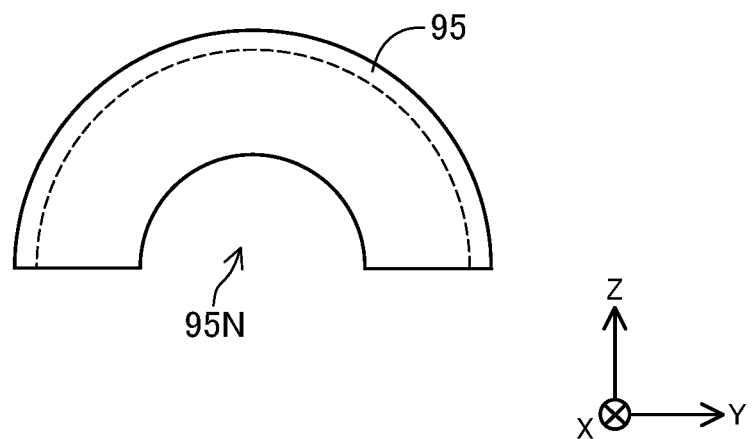
FIG. 12 is a diagram for explaining an example of a fixation member.
Figure 13:
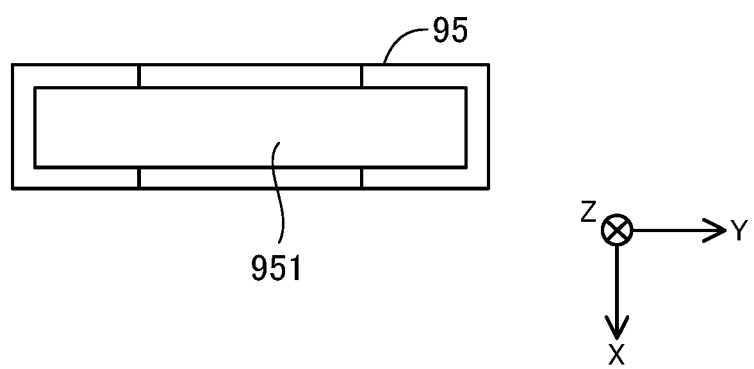
FIG. 13 is a diagram for explaining an example of the fixation member.

FIG. 12 and FIG. 13 are diagrams for explaining an example of a fixation member. XYZ axes in FIG. 12 and FIG. 13 correspond to the XYZ axes respectively in FIG. 9. A fixation member 95 is a semicircular member having a cut-out part 95N as illustrated in FIG. 12, and has an engagement portion 951 therein, which engages with the first and second flange portions 91 and 92, as illustrated in FIG. 13. The first flange portion 91, the second flange portion 92, and the fixation member 95 can be made of a synthetic resin such as a polyethylene, a polypropylene, and an acrylic resin.

In this case, when connecting the heart model 110 to the aorta model 160, the first and second flange portions 91 and 92 are fixed to each other using the fixation member 95 such that a −X axis-direction face of the disk member 912 of the first flange portion 91 and a +X axis-direction face of the disk member 922 of the second flange portion 92 are abutted against each other, as illustrated in FIG. 11. The cut-out part 95N is fitted onto the cylindrical bodies 913 and 923, and the engagement portion 951 engages with outer edges of the disk members 912 and 922, so that the fixation member 95 fixes the first and second flange portions 91 and 92 to each other. Thereby, the heart model 110 can be connected to the aorta model 160 in the same manner as in FIG. 9, so that the fluid flowing through the inner cavity 160L of the aorta model 160 can be fed to the inner cavity 111L of the cardiac vessel model 111. Incidentally, the configurations in FIG. 10 to FIG. 13 may be adopted for the other biological model connecting portions, the fluid feeding portion connecting portion 163Jb, the other partial blood vessel models, and the trachea model 121.

As described above, in this case, the first flange portion 91 on the ascending aorta portion 161 (aorta model 160) side and the second flange portion 92 on the cardiac vessel model 111 (partial blood vessel model) side are fixed to each other so as to be abutted against each other, so that the biological model can be easily connected to the aorta model 160. Additionally, in this case, the first flange portion 91 and the second flange portion 92 can be easily fixed to each other using the fixation member 95. Incidentally, when fixing the first and second flange portions 91 and 92 to each other without using the fixation member 95, the disk members 912 and 922 may be fixed to each other using a fixture such as a clip.

Incidentally, in the cases of FIG. 10 and FIG. 11, elastic body layers 914 and 924 made of an elastic body are disposed on an abutting face between the first flange portion 91 and the second flange portion 92 (specifically, the −X axis-direction face of the disk member 912 and the +X axis-direction face of the disk member 922) respectively. Similarly to the disk members 912 and 922, the elastic body layers 914 and 924 have openings (through holes) (e.g., opening 914O in elastic body layer 914) communicating with the openings 161O and 111O. Such a configuration having the elastic body layers 914 and 924 makes it possible to improve airtightness of the connection portion between the first flange portion 91 and the second flange portion 92—in other words, the connection portion between the ascending aorta portion 161 (aorta model 160) and the cardiac vessel model 111 (partial blood vessel model)—to prevent the fluid from leaking at the connection portion.

Incidentally, the aforementioned first flange portion 91 and second flange portion 92 may be provided with different shapes, different colors, and different marks for each combination of the biological model connecting portion and the corresponding partial blood vessel model. For example, the first flange portion 91 of the first connection portion 162J and the second flange portion 92 of the cerebral vessel model 131 may be colored yellow, and the first flange portion 91 of the second connection portion 161J and the second flange portion 92 of the cardiac vessel model 111 may be colored red. In this way, it is possible to grasp at a glance what biological model (specifically, the partial blood vessel model leading to the biological model) is preferably connected to what biological model connecting portion, and therefore the usability can be improved. In addition, the disk member 912 of the first flange portion 91 of the first connection portion 162J and the disk member 922 of the second flange portion 92 of the cerebral vessel model 131 may be formed in a rectangular shape, and the disk member 912 of the first flange portion 91 of the second connection portion 161J and the disk member 922 of the second flange portion 92 of the cardiac vessel model 111 may be formed in a semicircular shape. The same effect can also be obtained in this way.

Figure 14:
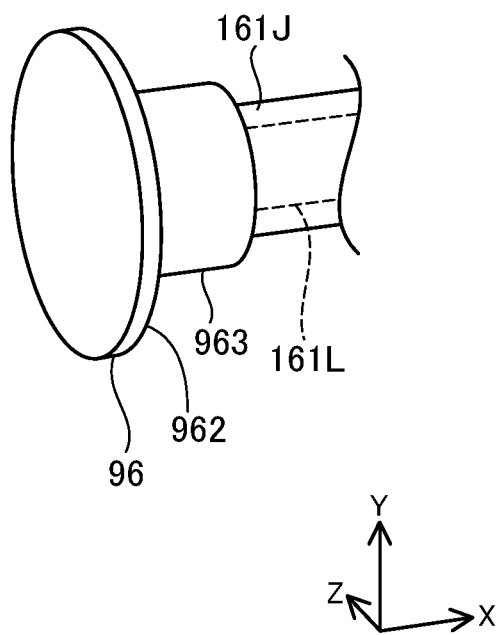
FIG. 14 is a diagram for explaining an example of the biological model connecting portion during nonuse.

FIG. 14 is a diagram for explaining an example of the biological model connecting portion during nonuse. XYZ axes in FIG. 14 correspond to the XYZ axes respectively in FIG. 9. When the biological model (heart model 110) is not connected to the ascending aorta portion 161 (aorta model 160), an occlusion member 96 illustrated in FIG. 14, instead of the first flange portion 91 explained in FIG. 10 and FIG. 11, may be attached to the ascending aorta portion 161. The occlusion member 96 includes a cylindrical body 963 and a disk member 962 having no opening, instead of the disk member 912. When the occlusion member 96 is attached to the ascending aorta portion 161, the opening 161O formed on the ascending aorta portion 161 of the ascending aorta portion 161 is closed, so that the fluid passing through the inner cavity 161L can be prevented from leaking from the opening 161O. Incidentally, during nonuse, the occlusion member 96 illustrated in FIG. 14 may be attached to the other biological model connecting portions, the fluid feeding portion connecting portion 163Jb, the other partial blood vessel models, and the trachea model 121.

Figure 15:
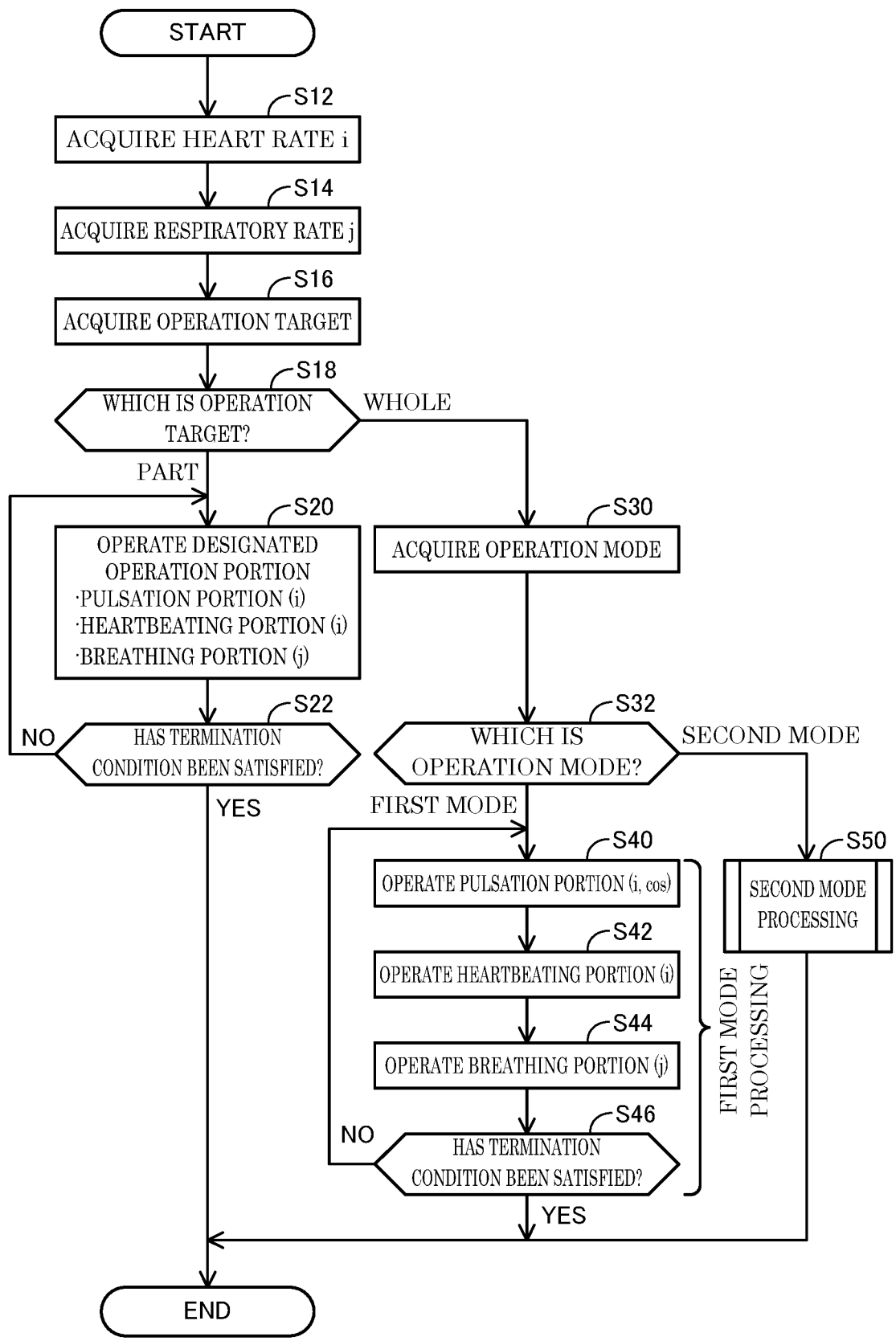
FIG. 15 is a flowchart illustrating an example of a processing procedure in a control portion.

FIG. 15 is a flowchart illustrating an example of a processing procedure in the control portion. The control portion 40 controls operations of the pulsation portion 50, the beat portion 60, and the breathing portion 70 by the processing illustrated in FIG. 15. The control portion 40 starts the processing in FIG. 15 at any timing (e.g. a timing when the human body simulation device 1 is powered on, a timing when the processing start instruction is acquired from the input portion 45, or the like).

In step S12, the control portion 40 acquires a heart rate i. Specifically, the control portion 40 causes the input portion 45 (touch panel) to display a screen for designating a heart rate, and acquires a value input by the user. The value is defined as the heart rate i. If the user does not designate the heart rate, the control portion 40 may designate the heart rate i as a prescribed default value. In step S14, the control portion 40 acquires a respiratory rate j. Specifically, the control portion 40 causes the input portion 45 to display a screen for designating a respiratory rate, and acquires a value input by the user. The value is defined as the respiratory rate j. If the user does not designate the respiratory rate, the control portion 40 may designate the respiratory rate j as a prescribed default value. Incidentally, steps S12 and S14 may be performed at the same time.

In step S16, the control portion 40 acquires an operation target. Specifically, the control portion 40 causes the input portion 45 to display a screen for designating what operation portion is operated among the pulsation portion 50, the beat portion 60, and the breathing portion 70, and acquires an operation target designated by the user. Incidentally, the user can designate one or more (a plurality) of the pulsation portion 50, the beat portion 60, and the breathing portion 70 as the operation targets. In step S18, the control portion 40 determines whether the operation target designated in step S16 is a part or the whole of the pulsation portion 50, the beat portion 60, and the breathing portion 70. When the designated operation target is a part (step S18: part), the control portion 40 shifts the processing to step S20. On the other hand, when the designated operation target is the whole (step S18: whole), the control portion 40 shifts the processing to step S30.

In step S20, the control portion 40 operates an operation portion designated by the user in step S16. When operation of the pulsation portion 50 is designated, the control portion 40 operates the pulsation portion 50 such that a pulsation rate of the pulsation portion 50 coincides with the heart rate i acquired in step S12. When operation of the beat portion 60 is designated, the control portion 40 operates the beat portion 60 such that a beat rate of the beat portion 60 coincides with the heart rate i acquired in step S12. Incidentally, when both the pulsation portion 50 and the beat portion 60 are operated, the control portion 40 may shift a phase of the pulsation portion 50 and a phase of the beat portion 60. When operation of the breathing portion 70 is designated, the control portion 40 operates the breathing portion 70 such that a respiratory rate of the breathing portion 70 coincides with the respiratory rate j acquired in step S14.

In step S22, the control portion 40 determines whether or not a termination condition of the processing has been satisfied. Various arbitrary conditions can be adopted as the termination condition. For example, when the human body simulation device 1 is powered off, or when a termination instruction of the processing is acquired from the input portion 45, or the like, the control portion 40 can determine that the termination condition has been satisfied. When the termination condition has been satisfied (step S22: YES), the control portion 40 terminates the processing. If the termination condition has not been satisfied (step S22: NO), the control portion 40 shifts the processing to step S20 and continues the designated operation of the operation portion using the designated heart rate i and respiratory rate j.

On the other hand, in step S30, the control portion 40 acquires an operation mode. Specifically, the control portion 40 causes the input portion 45 to display a screen for designating which operation mode is selected between "first mode" and "second mode", and acquires an operation mode designated by the user. In the first embodiment, the first mode means an operation mode for regularly keeping the beat rate of the beat portion 60, the pulsation rate of the pulsation portion 50, the respiratory rate of the breathing portion 70 by constantly keeping the heart rate i and the respiratory rate j. On the other hand, the second mode means an operation mode for irregularly changing the beat rate of the beat portion 60, the pulsation rate of the pulsation portion 50, the respiratory rate of the breathing portion 70 by irregularly changing the heart rate i and the respiratory rate j.

In step S32, the control portion 40 shifts the processing depending on the operation mode acquired in step S30. When the operation mode acquired in step S30 is the first mode (step S32: first mode), the control portion 40 shifts the processing to step S40. When the operation mode acquired in step S30 is the second mode (step S32: second mode), the control portion 40 shifts the processing to step S50. The second mode processing in step S50 will be explained in FIG. 16.

In step S40, the control portion 40 executes the first mode processing in steps S40 to S46. Specifically, in step S40, the control portion 40 operates the pulsation portion 50 such that the pulsation rate of the pulsation portion 50 is a pulsation rate (i, cos) of which a phase is shifted by 90 degrees from the heart rate i acquired in step S12. In step S42, the control portion 40 operates the beat portion 60 such that the beat rate of the beat portion 60 coincides with the heart rate i acquired in step S12. In step S44, the control portion 40 operates the breathing portion 70 such that the respiratory rate of the breathing portion 70 coincides with the respiratory rate j acquired in step S14.

Then, in step S46, the control portion 40 determines whether or not a termination condition of the processing has been satisfied. Similarly to step S22, various arbitrary conditions can be adopted as the termination condition. The termination condition of step S46 and the termination condition of step S22 may be the same or different. When the termination condition has been satisfied (step S46: YES), the control portion 40 terminates the processing. If the termination condition has not been satisfied (step S46: NO), the control portion 40 shifts the processing to step S40 and continues the first mode processing.

Figure 16:
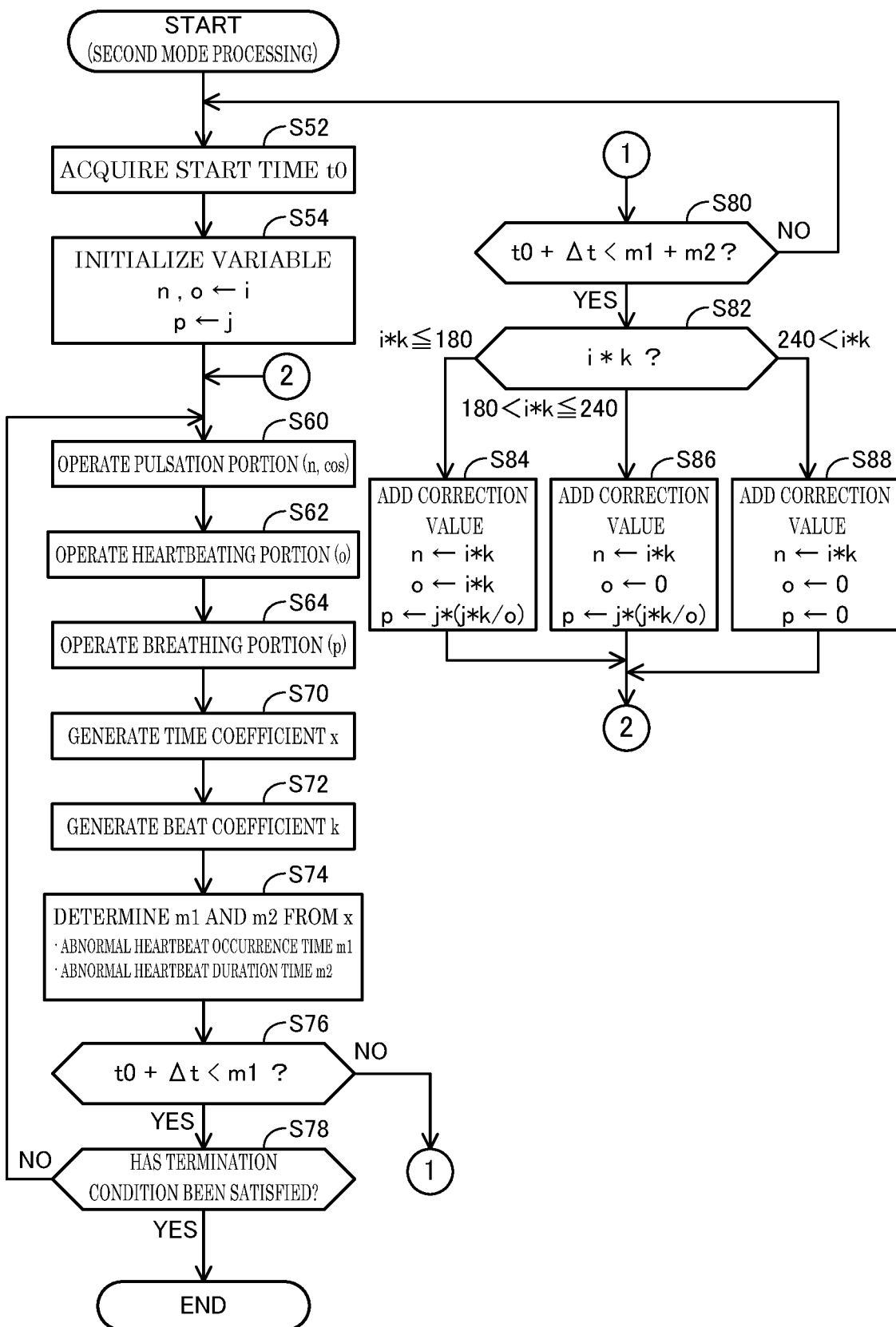
FIG. 16 is a flowchart illustrating an example of a procedure of a second mode processing.

FIG. 16 is a flowchart illustrating an example of a procedure of a second mode processing. In step S52, the control portion 40 acquires a current time, and the current time is defined as a start time t0. In step S54, the control portion 40 initializes a variable for use in the second mode processing. Specifically, in the control portion 40, the heart rate i acquired in step S12 (FIG. 15) is assigned to a variable n and a variable o, and the respiratory rate j acquired in step S14 (FIG. 15) is assigned to a variable p.

In steps S60 to S64, the control portion 40 operates the pulsation portion 50, the beat portion 60, and the breathing portion 70 by using the variables n, o, and p. Specifically, in step S60, the control portion 40 operates the pulsation portion 50 such that the pulsation rate of the pulsation portion 50 is a pulsation rate (n, cos) of which a phase is shifted by 90 degrees from the variable n. In step S62, the control portion 40 operates the beat portion 60 such that the beat rate of the beat portion 60 coincides with the variable o. In step S64, the control portion 40 operates the breathing portion 70 such that the respiratory rate of the breathing portion 70 coincides with the variable p. In steps S60 to S64 after initialization of the variables n, o, and p (step S54), the variables n and o are equal to the heart rate i input by the user, and the variable p is equal to the respiratory rate j input by the user. Thus, in steps S60 to S64 after initialization of the variables n, o, and p (step S54), the pulsation portion 50, the beat portion 60, and the breathing portion 70 are operated using a constantly-kept heart rate i (variable n, o) and a constantly-kept respiratory rate j (variable p).

In step S70, the control portion 40 generates a random number, and this random number is defined as a time coefficient x. In step S72, the control portion 40 generates a random number, and this random number is defined as a beat coefficient k.

In step S74, the control portion 40 determines an abnormal heartbeat occurrence time m1 and an abnormal heartbeat duration time m2 from the time coefficient x. Herein, the abnormal heartbeat occurrence time m1 means a time to start the change (from the constant mode to the irregular mode) in the beat rate of the beat portion 60, the pulsation rate of the pulsation portion 50, and the respiratory rate of the breathing portion 70. In addition, the abnormal heartbeat duration time m2 means a duration time for irregularly keeping the beat rate of the beat portion 60, the pulsation rate of the pulsation portion 50, and the respiratory rate of the breathing portion 70. The control portion 40 can determine the abnormal heartbeat occurrence time m1 and the abnormal heartbeat duration time m2 using the time coefficient x in any method. For example, in the control portion 40, the abnormal heartbeat occurrence time m1 may be represented by t0+x (min), and the abnormal heartbeat duration time m2 may be represented by x (min). In this case, when the time coefficient x being 5 is taken as an example, the abnormal heartbeat occurrence time m1 is 5 minutes after the start time t0 of step S52, and the abnormal heartbeat duration time m2 is 5 minutes.

Figure 17:
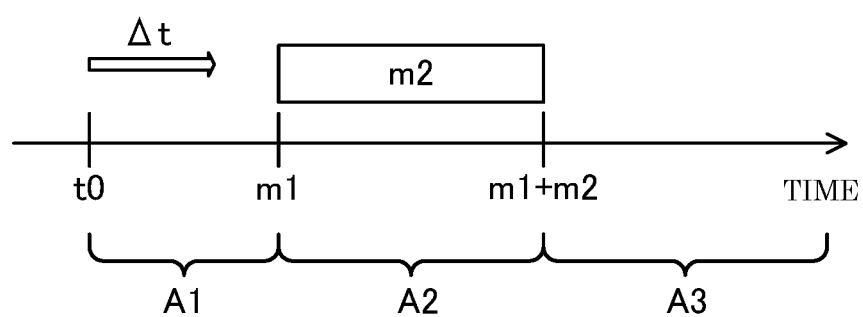
FIG. 17 is a diagram for explaining step S76 in the second mode processing.

FIG. 17 is a diagram for explaining step S76 in the second mode processing. In step S76 in the second mode processing (FIG. 16), the control portion 40 determines whether or not a sum (i.e. current time) of the start time t0 acquired in step S52 and an elapsed time Δt from the start time t0 is smaller than the abnormal heartbeat occurrence time m1 determined in step S74. If the current time is smaller than the abnormal heartbeat occurrence time m1 (step S76: YES, FIG. 17: region A1), the control portion 40 shifts the processing to step S78. In step S78, the control portion 40 determines whether or not a termination condition of the processing has been satisfied. Similarly to step S22 in FIG. 15, various arbitrary conditions can be adopted as the termination condition. The termination condition of step S78 and the termination condition of step S22 may be the same or different.

If the current time is larger than or equal to the abnormal heartbeat occurrence time m1 (step S76: NO, FIG. 17: region A2 or region A3), the control portion 40 shifts the processing to step S80. In step S80, the control portion 40 determines whether or not the sum (i.e. current time) of the start time to acquired in step S52 and the elapsed time Δt from the start time t0 is smaller than a sum of the abnormal heartbeat occurrence time m1 and the abnormal heartbeat duration time m2 determined in step S74. If the current time is larger than or equal to the sum of the times m1 and m2 (step S80: NO, FIG. 17: region A3), the control portion 40 shifts the processing to step S52 (acquisition of the start time t0) and repeats the processing.

If the current time is smaller than the sum of the times m1 and m2 (step S80: YES, FIG. 17: region A2), the control portion 40 shifts the processing to step S82. In step S82, the control portion 40 allocates the processing to the following first to third patterns depending on a value obtained by multiplying the heart rate i acquired in step S12 (FIG. 15) by the beat coefficient k generated in step S72. The following first to third patterns correspond to a plurality of patterns that simulate severities of a patient. In the case of FIG. 16, it is assumed that the third pattern is the most serious and the first pattern is the mildest.

When the value obtained by multiplying the heart rate i by the beat coefficient k is smaller than or equal to 180 (step S82: i*k≤180), the control portion 40 adds a correction value in the first pattern in step S84. Specifically, in the control portion 40, the product obtained by multiplying the heart rate i by the beat coefficient k is assigned to the variable n, the product obtained by multiplying the heart rate i by the beat coefficient k is assigned to the variable o, and the product obtained by multiplying the respiratory rate j by (respiratory rate j×beat coefficient k/variable o) is assigned to the variable p.

When the value obtained by multiplying the heart rate i by the beat coefficient k is larger than 180 and smaller than or equal to 240 (step S82: 180<i*k≤240), the control portion 40 adds a correction value in the second pattern in step S86. Specifically, in the control portion 40, the product obtained by multiplying the heart rate i by the beat coefficient k is assigned to the variable n, 0 is assigned to the variable o, and the product obtained by multiplying the respiratory rate j by (respiratory rate j×beat coefficient k/variable o) is assigned to the variable p.

When the value obtained by multiplying the heart rate i by the beat coefficient k is larger than 240 (step S82: 240<i*k), the control portion 40 adds a correction value in the third pattern in step S88. Specifically, in the control portion 40, the product obtained by multiplying the heart rate i by the beat coefficient k is assigned to the variable n, 0 is assigned to the variable o, and 0 is assigned to the variable p.

After steps S84, S86, and S88 are completed, the control portion 40 shifts the processing to step S60 and repeats the aforementioned processing. Thereby, in steps S60, S62, and S64, the pulsation portion 50, the beat portion 60, and the breathing portion 70 are operated, using the variables n, o, and p to which correction values have been added in any of the first to third patterns, in other words, using the variables n, o, and p that have been irregularly changed by the first to third patterns and the randomly-generated beat coefficient k.

As described above, since the human body simulation device 1 according to the first embodiment includes the heart model 110 simulating a heart and the blood vessel models simulating blood vessels (aorta model 160, cardiac vessel model 111, cerebral vessel model 131, hepatic vessel model 141, lower limb vessel model 151), it is possible to simulate e.g. a treatment or inspection procedure using a medical device for minimally invasive treatment or inspection of the heart, such as Percutaneous Coronary Intervention (PCI) for ischemic heart disease. In addition, the control portion 40 of the human body simulation device 1 can change the beat rate of the beat portion 60 for causing the heart model 110 to beat, and a pulsation rate of the pulsation portion 50 for sending the fluid into each blood vessel model such as the aorta model 160, depending on the prescribed heart rate i (FIG. 15: steps S12, S20, S40, S42). Thus, it is possible to simulate a treatment or inspection procedure under various conditions of the beat rate and pulsation rate.

In addition, in the human body simulation device 1 according to the first embodiment, the control portion 40 can change the respiratory rate of the breathing portion 70 depending on the prescribed respiratory rate j (FIG. 15: steps S14, S20, S44). Thereby, it is possible to simulate the treatment or inspection procedure in a more practical manner. Furthermore, since the human body simulation device 1 according to the first embodiment includes the input portion 45 for inputting the heart rate i and the respiratory rate j, the user of the human body simulation device 1 can freely set the beat rate of the beat portion 60, the pulsation rate of the pulsation portion 50, and the respiratory rate of the breathing portion 70.

Furthermore, in the human body simulation device 1 according to the first embodiment, the control portion 40 can switch and execute the first mode simulating a patient in a normal state by regularly keeping the beat rate, the pulsation rate, and the respiratory rate (FIG. 15: steps S40 to S46), and the second mode simulating a patient in an arrhythmic state by irregularly changing the beat rate, the pulsation rate, and the respiratory rate (FIG. 15: step S50, FIG. 16). Thus, the human body simulation device 1 makes it possible to simulate a treatment or inspection procedure under both the normal state and the arrhythmic state.

Furthermore, in the human body simulation device 1 according to the first embodiment, the control portion 40 determines the heart rate i and the respiratory rate j (i.e. variables n, o, p) in the second mode (FIG. 16) in accordance with one pattern randomly selected from the first to third patterns simulating the severities of the patient using the randomly determined beat coefficient k (step S82). Thus, to simulate a sudden change of an actual patient's condition, the beat rate of the beat portion 60, the pulsation rate of the pulsation portion 50, and the respiratory rate of the breathing portion 70 can be changed in a manner unpredictable by the user of the human body simulation device 1. Thus, the human body simulation device 1 make it possible to simulate a treatment or inspection procedure in a more practical manner.

Furthermore, in the human body simulation device 1 according to the first embodiment, since the control portion 40 repeatedly executes the first cycle (FIG. 17: regions A1, A3) in which the beat rate, the pulsation rate, and the respiratory rate are kept constant and the second cycle (FIG. 17: region A2) in which the beat rate, the pulsation rate, and the respiratory rate are changed in the second mode (FIG. 16), a patient's condition repeating arrhythmia and lull can be reproduced. Additionally, in the control portion 40, an abnormal heartbeat occurrence time m1 at which the second cycle starts for changing the beat rate, the pulsation rate, and the respiratory rate, and the abnormal heartbeat duration time m2 during which the second cycle continues are randomly determined using the randomly-determined time coefficient x, in the second mode (FIG. 16: step S74). Thus, the beat rate, the pulsation rate, and the respiratory rate can be changed in a manner unpredictable by the user of the human body simulation device 1. As a result, the human body simulation device 1 makes it possible to simulate a treatment or inspection procedure in a more practical manner.

Furthermore, the control portion 40 can switch and execute a partial operation for operating at least any one of the pulsation portion 50, the beat portion 60, and the breathing portion 70 (FIG. 15: step S20) and the whole operation for operating the all portions (FIG. 15: steps S40 to S44) (FIG. 15: step S18). Thus, convenience for the user of the human body simulation device 1 can be improved.

Second Embodiment

Figure 18:
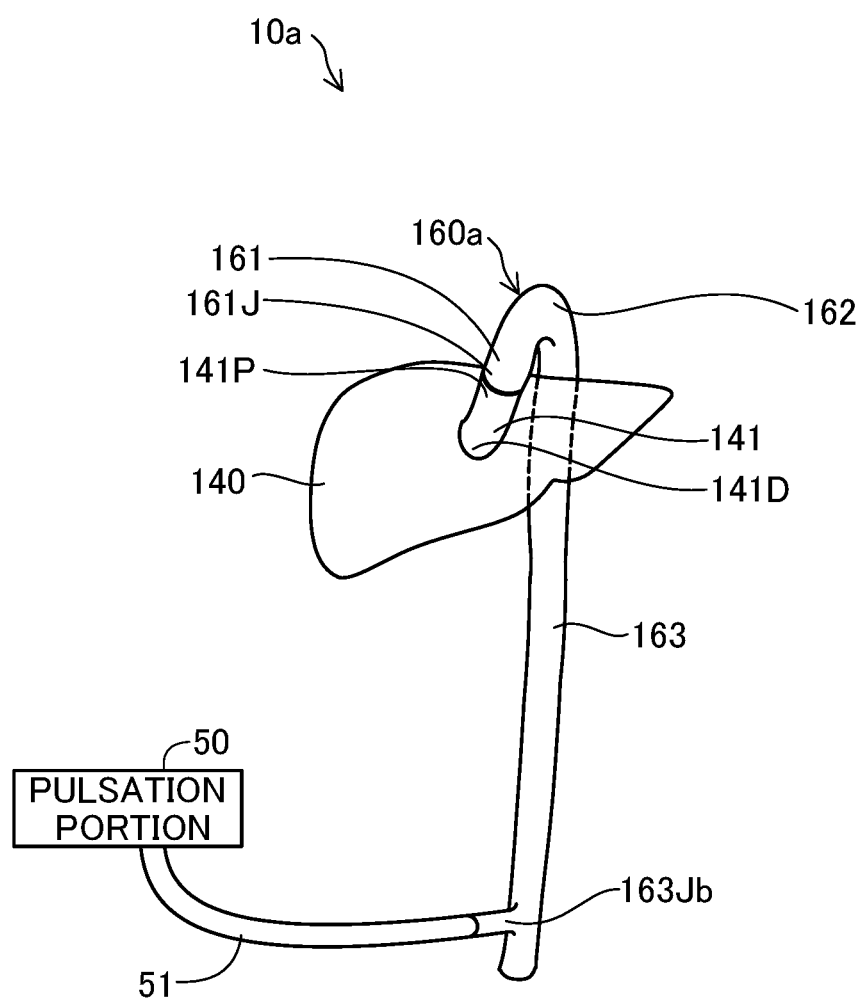
FIG. 18 is an explanatory diagram illustrating an example of a configuration of a model according to the second embodiment.

FIG. 18 is an explanatory diagram illustrating an example of a configuration of a model 10a according to the second embodiment. The first embodiment (FIG. 4) describes, as an example, a case that, among the biological model connecting portions included in the aorta model 160, the second connection portion 161J is connected with the heart model 110, the first connection portion 162J is connected with the brain model 130, and the third connection portion 163Ja is connected with the liver model 140, and the fourth connection portion 164J is connected with the lower limb model 150. However, the biological model connecting portions and the biological models connected to the biological model connecting portions are not necessarily combined in the aforementioned combinations. For example, as illustrated in FIG. 18, the liver model 140 may be connected to the second connection portion 161J. Additionally, in the second embodiment, instead of the aorta model 160 having the plurality of biological model connecting portions, an aorta model 160a may have just one biological model connecting portion (the second connection portion 161J in the illustrated case). Also in such a way, the same effect as in the aforementioned first embodiment can be exhibited.

Third Embodiment

Figure 19:
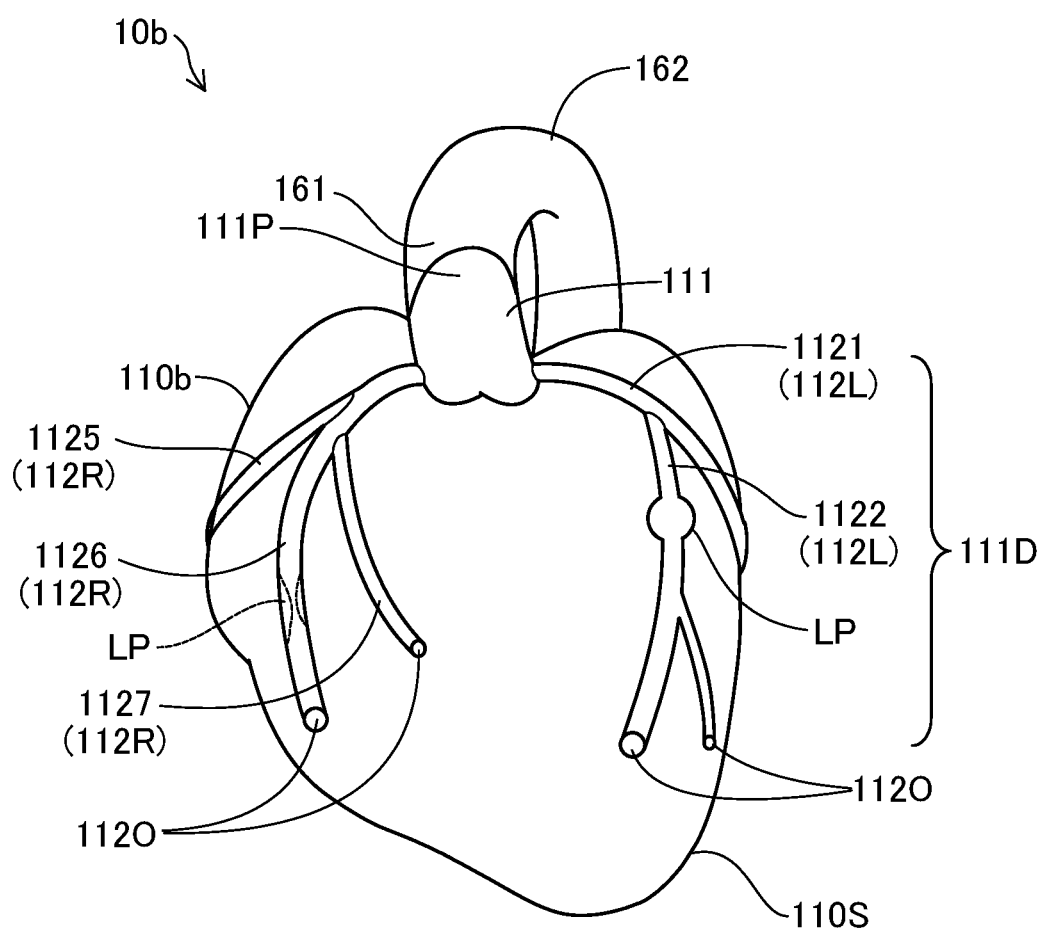
FIG. 19 is a diagram illustrating an example of a heart model according to the third embodiment.

FIG. 19 is a diagram illustrating an example of a heart model 110b according to the third embodiment. In the first embodiment (FIG. 6), the distal end 111D of the cardiac vessel model 111 was supposed to branch into the integrally-formed left and right coronary artery models 112L and 112R. However, the left and right coronary artery models 112L and 112R may include a plurality of blood vessel constituting portions 1121, 1122, 1125, 1126, and 1127 that constitute each portion of the blood vessel. In addition, lesion portions simulating lesions inside and outside the blood vessel may be formed on at least a part of each blood vessel constituting portion 1121, 1122, 1125, 1126, or 1127. In the case of FIG. 19, a bump-like lesion portion LP is formed outside the blood vessel of the blood vessel constituting portion 1122 in the left coronary artery model 112L. In addition, a stenosed lesion portion LP is formed inside the blood vessel of the blood vessel constituting portion 1126 in the right coronary artery model 112R. In such a heart model 110b according to the third embodiment, for the same vascular constituting portion, both a blood vessel constituting portion having no lesion portion LP and a blood vessel constituting portion having the lesion portion LP are further prepared, and may be configured so as to be replaceable with each other.

Incidentally, in FIG. 19, the heart model 110b is illustrated. However, the same configuration as in the third embodiment can be adopted also for other biological models having a partial blood vessel model (FIG. 4: brain model 130, liver model 140, lower limb model 150). Also, the same configuration as in the third embodiment may be adopted for the aorta model 160 (FIG. 3).

Also in such a way, the same effect as in the first embodiment can be exhibited. In addition, in a model 10b according to the third embodiment, the partial blood vessel model (cardiac vessel model 111) includes the plurality of blood vessel constituting portions 1121, 1122, 1125, 1126, and 1127, and the lesion portions LP simulating lesions are formed on at least a part of the plurality of blood vessel constituting portions 1121, 1122, 1125, 1126, and 1127. Thus, an operator can simulate a procedure (e.g. a procedure such as PCI) using a medical device such as a guide wire and a catheter for the lesion portion LP formed on the partial blood vessel model.

Fourth Embodiment

Figure 20:
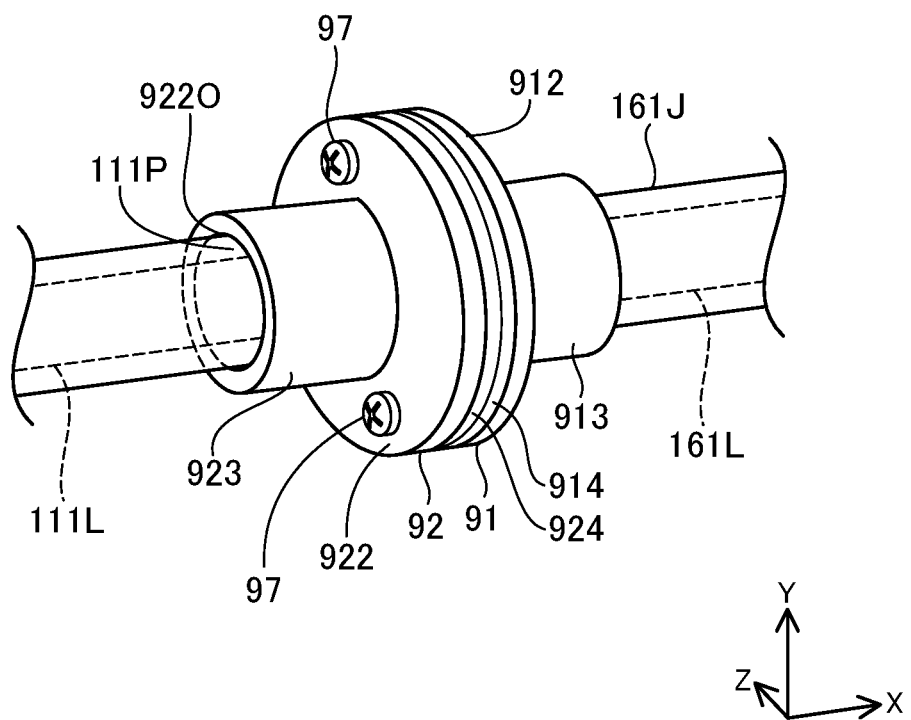
FIG. 20 is a diagram for explaining a biological model connecting portion according to the fourth embodiment.

FIG. 20 is a diagram for explaining a biological model connecting portion according to the fourth embodiment. In the first embodiment (FIG. 11), the first flange portion 91 and the second flange portion 92 were fixed to each other by using the fixation member 95 having the configuration illustrated in FIG. 12 and FIG. 13. However, the first flange portion 91 and the second flange portion 92 may be fixed to each other by using a fixation member having a configuration different from that of the fixation member 95. For example, as illustrated in FIG. 20, the first flange portion 91 and the second flange portion 92 may be fixed to each other by using the screw 97. Also in such a way, the same effect as in the aforementioned first embodiment can be exhibited.

Fifth Embodiment

Figure 21:
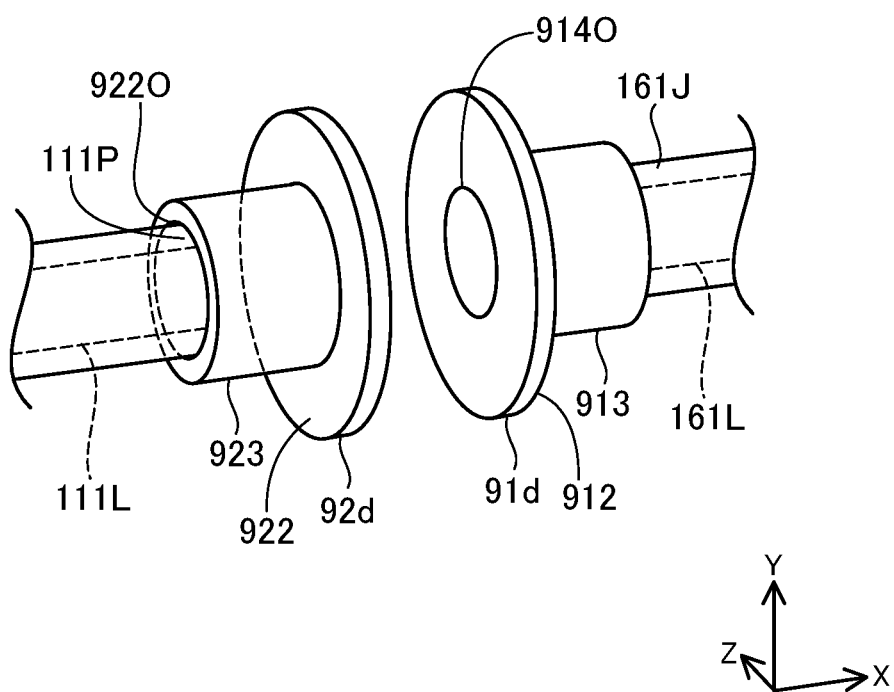
FIG. 21 is a diagram for explaining a biological model connecting portion according to the fifth embodiment.

FIG. 21 is a diagram for explaining a biological model connecting portion according to the fifth embodiment. In the first embodiment (FIG. 10), the elastic body layers 914 and 924 made of the elastic body were disposed on the abutting faces of the first flange portion 91 and the second flange portion 92 respectively. However, at least one of the elastic body layers 914 and 924 may be omitted. For example, as illustrated in FIG. 21, it is allowed to adopt a configuration in which a first flange portion 91d does not include the elastic body layer and the second flange portion 92d does not include the elastic body layer. Also in such a way, the same effect as in the aforementioned first embodiment can be exhibited.

Sixth Embodiment

Figure 22:
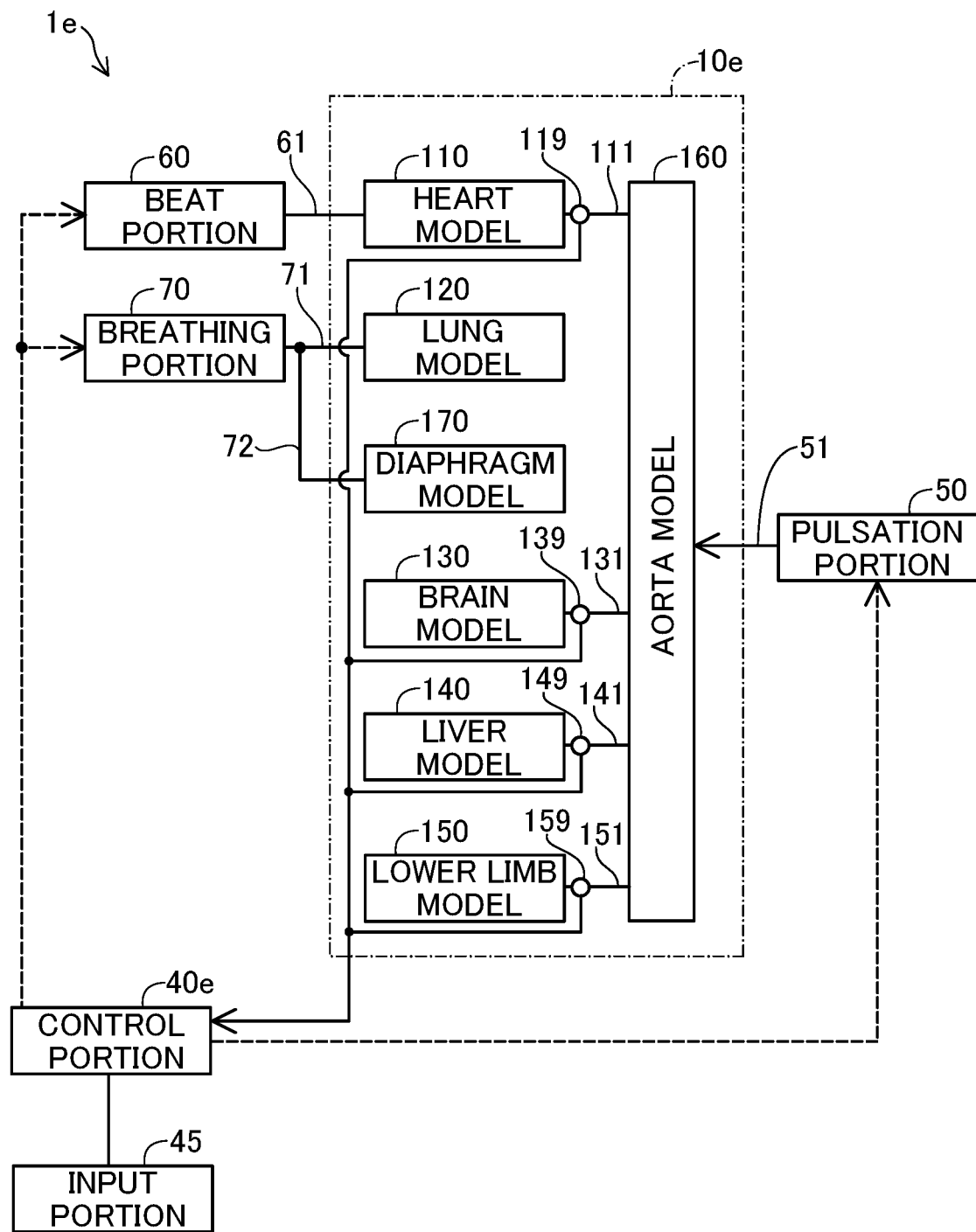
FIG. 22 is a diagram illustrating a schematic configuration of a human body simulation device according to the sixth embodiment.
Figure 23:
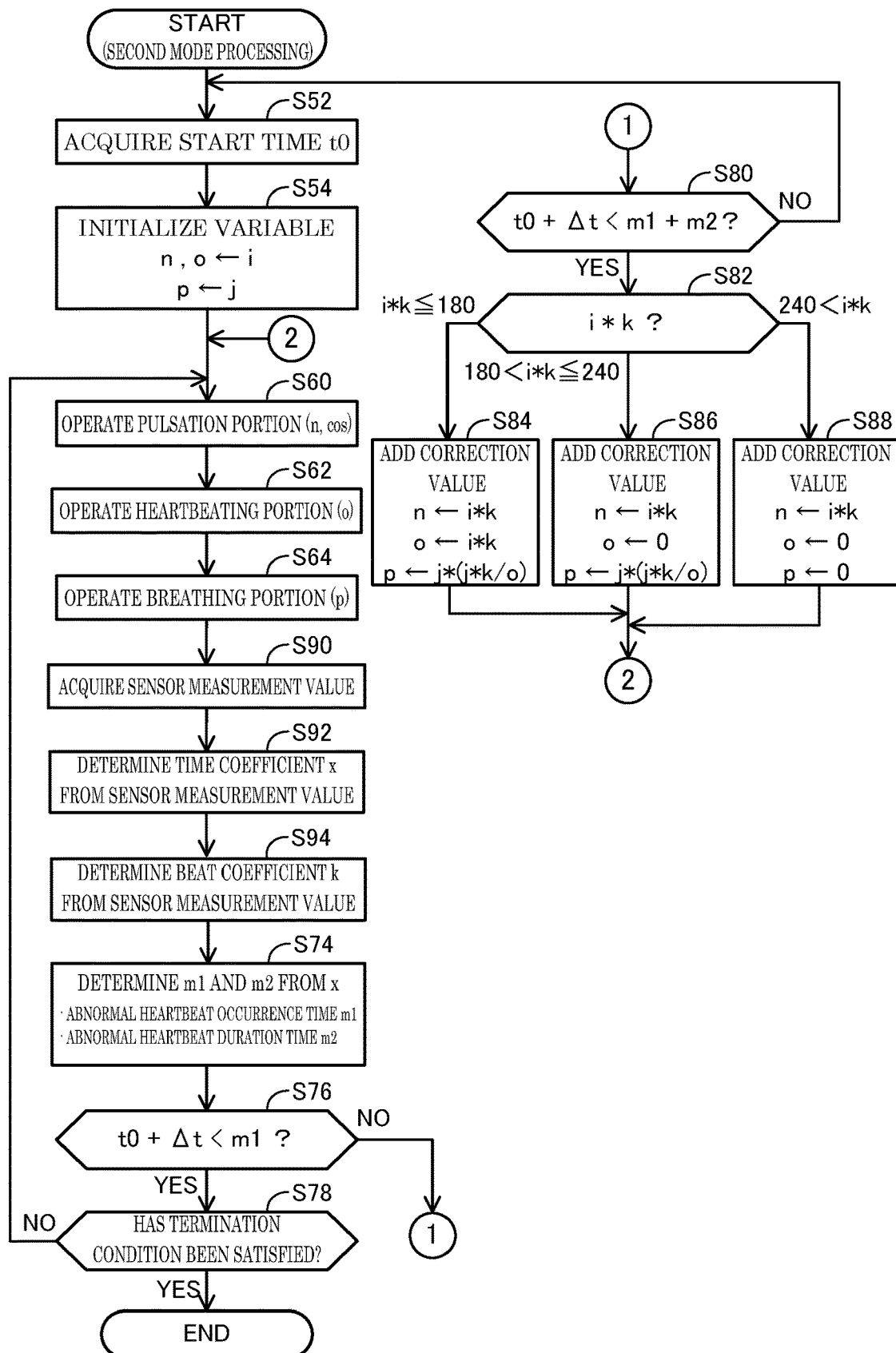
FIG. 23 is a flowchart illustrating an example of a procedure of a second mode processing according to the sixth embodiment.

FIG. 22 is a diagram illustrating a schematic configuration of a human body simulation device 1e according to the sixth embodiment. FIG. 23 is a flowchart illustrating an example of a procedure of a second mode processing according to the sixth embodiment. In the first embodiment (FIG. 2 and FIG. 16), the control portion 40 randomly determined the time coefficient x and the beat coefficient k to be used in the second mode processing, by using the random number. However, the time coefficient x and the beat coefficient k to be used in the second mode processing may be determined depending on a state of a biological model.

For example, as illustrated in FIG. 22, in the human body simulation device 1e according to the sixth embodiment, a model 10e includes a sensor 119 disposed on the distal end 111D of the cardiac blood vessel model 111, specifically the distal ends of the left and right coronary artery models 112L and 112R (FIG. 6, apex-side end portions of the left and right coronary artery models 112L and 112R). The sensor 119 detects a fluid pressure (blood pressure of the simulation blood) in a peripheral blood vessel. Similarly, the model 10e includes a sensor 139 disposed on the distal end 131D of the cerebral vessel model 131, a sensor 149 disposed on the distal end 141D of the hepatic vessel model 141, and a sensor 159 disposed on the distal end 151D of the lower limb vessel model 151. Each of the sensors 119, 139, 149, and 159 functionally serves as a "pressure measuring portion" for measuring the fluid pressure in the peripheral part of the partial blood vessel model.

As illustrated in FIG. 23, in the second mode processing according to the sixth embodiment, a control portion 40e determines the time coefficient x and the beat coefficient k depending on the pressure measured by the sensors 119, 139, 149, and 159. Specifically, in the second mode processing in FIG. 23, steps S90, S92, and S94 are executed instead of steps S70 and S72 in FIG. 16 (first embodiment). In step S90, the control portion 40e acquires the values measured by the sensors 119, 139, 149, and 159.

In step S92, the control portion 40e determines the time coefficient x from each sensor measurement value acquired in step S90. Specifically, the control portion 40e can determine the time coefficient x by means such as calculation (e.g. multiplication/division by a prescribed coefficient) using the sensor measurement value, and search (e.g. search for correspondence between a predetermined threshold value of the sensor measurement value and the time coefficient) using the sensor measurement value. At this time, the control portion 40e may determine the time coefficient x using only the measurement value of one sensor, or may determine the time coefficient x using the measurement values of a plurality of sensors. In step S94, the control portion 40e determines the beat coefficient k from each sensor measurement value acquired in step S90. Similarly to step S92, the control portion 40e can determine the beat coefficient k by means such as calculation using one or a plurality of sensor measurement values, and search using one or a plurality of sensor measurement values.

Also in such a way, the same effect as in the aforementioned first embodiment can be exhibited. In addition, in the human body simulation device 1e according to the sixth embodiment, the control portion 40e determines the heart rate i and the respiratory rate j (i.e. variables n, o, p) in the second mode (FIG. 23) in accordance with one pattern selected from the first to third patterns simulating the severities of the patient depending on the fluid pressure (i.e. value measured by the sensor 119, 139, 149, 159) in the peripheral part of the blood vessel model (cardiac vessel model 111, cerebral vessel model 131, hepatic vessel model 141, lower limb vessel model 151) (step S82). That means, the control portion 40e can change the beat rate of the beat portion 60, the pulsation rate of the pulsation portion 50, and the respiratory rate of the breathing portion 70 correspondingly to change in the blood pressure in the peripheral blood vessel. Thus, the human body simulation device 1e according to the sixth embodiment makes it possible to simulate a treatment or inspection procedure in a more practical manner.

Seventh Embodiment

Figure 24:
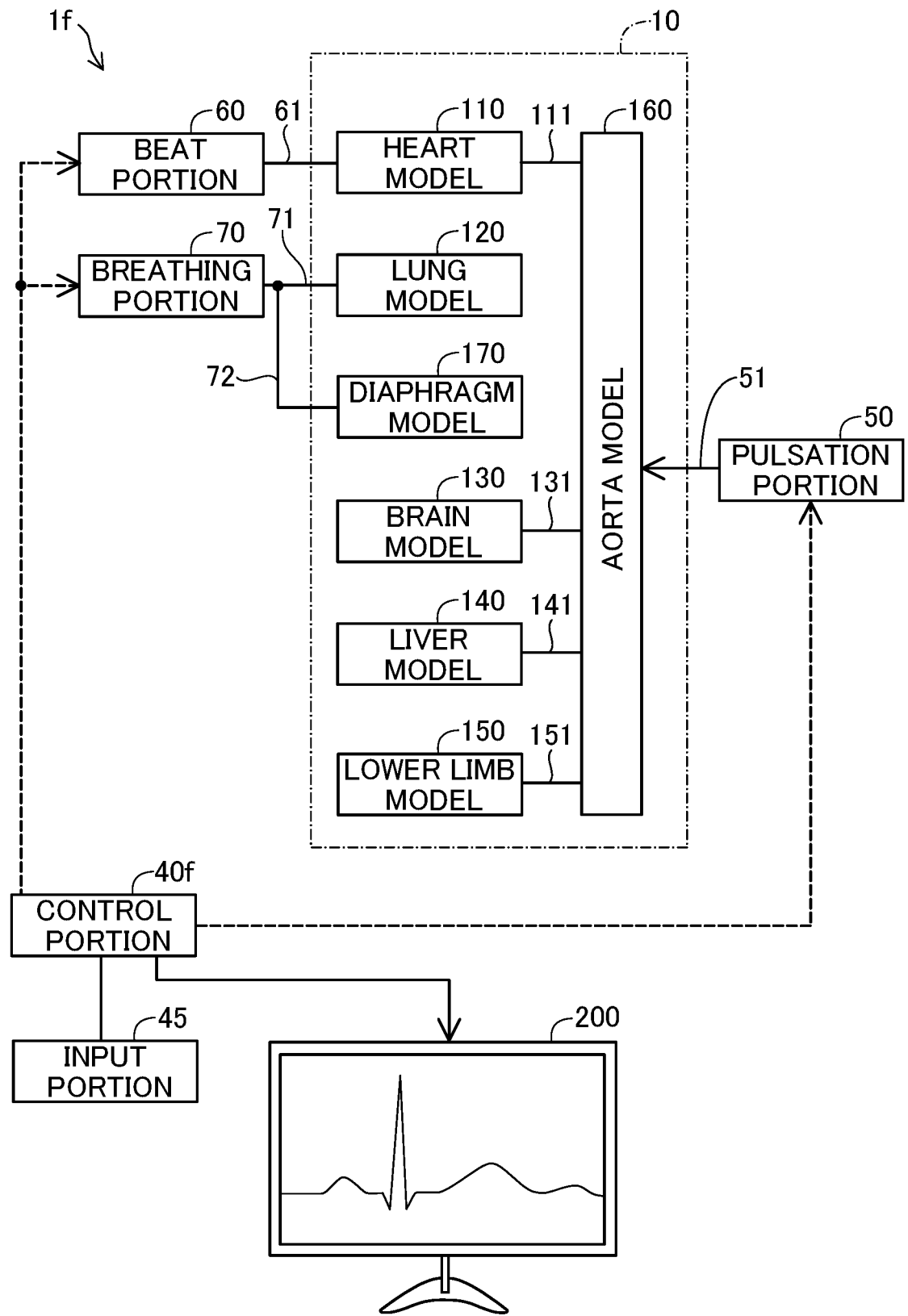
FIG. 24 is a diagram illustrating a schematic configuration of a human body simulation device according to the seventh embodiment.

FIG. 24 is a diagram illustrating a schematic configuration of a human body simulation device 1f according to the seventh embodiment. In the first embodiment (FIG. 2), an example of the device configuration of the human body simulation device 1 has been explained. However, the human body simulation device 1 may include various units used in actual treatment or inspection. For example, as illustrated in FIG. 24, the human body simulation device 1*f* according to the seventh embodiment includes a monitor (display portion) 200 connected to a control portion 40*f*. During execution of the processing explained in FIG. 15 and FIG. 16, the control portion 40*f* causes the monitor 200 to display a graph presenting the prescribed heart rate i and respiratory rate j, and the heart rate i and respiratory rate j changed in the second mode processing (i.e. variables n, o, p).

Also in such a way, the same effect as in the aforementioned first embodiment can be exhibited. In addition, in the human body simulation device 1*f* according to the seventh embodiment, since the control portion 40*f* causes the display portion 200 to display the graph presenting changes in the heart rate i and the respiratory rate j, a scene of the treatment or inspection can be reproduced in a more practical manner, and convenience for the user can be improved.

MODIFICATION EXAMPLES OF THE EMBODIMENTS

The disclosed embodiments are not limited to the above embodiments, and can be implemented in various aspects without departing from the gist of the disclosed embodiments. For example, the following modifications are also possible.

Modification Example 1

In the above first to seventh embodiments, some examples of the configurations of the human body simulation devices 1, 1*e* and 1*f* have been described. However, the configuration of the human body simulation device can be variously changed. For example, the human body simulation device need not include at least one of the water bath and the covering portion that covers the water bath. For example, the human body simulation device may include an input portion using a means other than the touch panel (e.g. sound, manipulation dial, button, or the like).

Modification Example 2

In the above first to seventh embodiments, some examples of the configurations of the models 10, 10*a*, 10*b*, and 10*e* have been described. However, the configuration of the model can be variously modified. For example, the aorta model need not include at least a part of the aforementioned first to fourth connection portions. For example, the arrangement of the aforementioned first to fourth connection portions in the aorta model may be optionally changed, and the first connection portion need not be disposed on or near the aortic arch. Similarly, the second connection portion need not be disposed on or near the ascending aorta, the third connection portion need not be disposed on or near the abdominal aorta, and the fourth connection portion need not be disposed on or near the common iliac aorta. For example, the number of the biological model connecting portions in the aorta model can be optionally changed, and a new biological model connecting portion for connecting biological models (e.g. stomach model, pancreas model, kidney model, or the like) not described above may be provided.

For example, the model need not include at least a part of the heart model, the lung model, the brain model, the liver model, the lower limb model, and the diaphragm mode. When omitting the heart model, the beat portion can be concurrently omitted. When omitting the lung model and the diaphragm model, the breathing portion can be concurrently omitted. For example, the model may be configured as a complex additionally including bone models simulating at least a part of human skeletons such as rib, sternum, thoracic spine, lumbar spine, femur, and tibia.

For example, the configurations of the aforementioned heart model, lung model, brain model, liver model, lower limb model, and diaphragm model may be optionally changed. For example, the inner cavity of the heart model and the beat portion that sends the fluid into the inner cavity of the heart model may be omitted (FIG. 4). For example, the cardiac vessel model of the heart model need not include the right and left coronary artery models, and each of the right and left coronary artery models may be configured in an attachable/detachable manner (FIG. 6). For example, in the lung model, an individual inner cavity may be placed on each of the right and left lungs (FIG. 4). For example, the lower limb model may additionally include a skin model that covers a femoral muscle (FIG. 5).

Modification Example 3

In the above first to seventh embodiments, some examples of the processing procedures in the control portions 40, 40*e*, and 40*f* have been described. However, the processing in the control portion can be variously modified. For example, at least either one of the partial operation of the pulsation portion, the beat portion, and the breathing portion (FIG. 15: steps S20, S22) or the whole operation (FIG. 15: steps S30 to S50) may be omitted. For example, at least either one of the first operation mode processing (FIG. 15: steps S40 to S46) or the second operation mode processing (FIG. 15: steps S50, FIG. 16, FIG. 23) may be omitted. For example, the control portion may execute the second mode processing using one variable that unifies the time coefficient x and a time coefficient y.

For example, the control portion need not perform the breathing portion control based on the respiratory rate j and the respiratory rate j (or variable p) (FIG. 15: steps S20, S44, FIG. 16: step S64). For example, the control portion need not perform the pulsation portion control based on the heart rate i and the heart rate i (or variable n) (FIG. 15: steps S20, S40, FIG. 16: step S60). For example, the control portion need not perform the beat portion control based on the heart rate i and the heart rate i (or variable o) (FIG. 15: steps S20, S42, FIG. 16: step S62).

Modification Example 4

The configurations of the human body simulation devices according to the first to seventh embodiments, and the configurations of the human body simulation devices according to the modification examples 1 to 3 may be appropriately combined.

Although the aspects explained above are based on the embodiments and the modification examples, the embodiments of the aforementioned aspects are made for facilitating understanding of the aspects, and do not limit the aspects. The aspects can be modified and improved without departing from the spirit of the aspects and claims, and equivalents thereof are included in the aspects. In addition, unless the technical features of the aspects are explained as essential in the present specification, the technical features can be omitted as appropriate.

What is claimed is:

1. A human body simulation device comprising:
a biological model simulating a part of a human body, and comprising a partial blood vessel model simulating a part of blood vessels; and
an aorta model simulating an aorta, and comprising:
a biological model connecting portion configured to attachably/detachably connect the biological model to the aorta model in a state where an inner cavity of the aorta model and an inner cavity of the partial blood vessel model are in communication with each other; and
a fluid feeding portion connecting portion configured to connect to a fluid feeding pump system that is configured to feed a fluid into the inner cavities, wherein the biological model connecting portion comprises at least two or more connection portions selected from the group consisting of:
a first connection portion configured to connect a brain model simulating a brain;
a second connection portion configured to connect a heart model simulating a heart;
a third connection portion configured to connect a liver model simulating a liver; and
a fourth connection portion configured to connect a lower limb model simulating a lower limb.

2. The human body simulation device according to claim 1, wherein the aorta model is configured such that:
the first connection portion is disposed on or near a portion of the aorta model simulating an aortic arch;
the second connection portion is disposed on or near a portion of the aorta model simulating an ascending aorta;
the third connection portion is disposed on or near a portion of the aorta model simulating an abdominal aorta; and
the fourth connection portion is disposed on or near a portion of the aorta model simulating a common iliac aorta.

3. The human body simulation device according to claim 2, wherein:
the partial blood vessel model comprises a plurality of blood vessel constituting portions that constitute each portion of the part of blood vessels, and
at least a part of the plurality of blood vessel constituting portions has a lesion portion simulating a lesion inside or outside the blood vessel.

4. The human body simulation device according to claim 2, wherein:
the biological model connecting portion comprises a first flange portion formed on an outer periphery of an opening leading to the inner cavity of the aorta model,
the partial blood vessel model comprises a second flange portion formed on an outer periphery of an opening leading to the inner cavity of the partial blood vessel model, and
the biological model is connectable to the aorta model by fixing the first flange portion and the second flange portion to each other so as to be abutted against each other.

5. The human body simulation device according to claim 4, further comprising:
a fixation member that is configured to fix the first flange portion and the second flange portion to each other by engaging the fixation member to outer edges of the abutted first flange portion and second flange portion.

6. The human body simulation device according to claim 2, wherein the partial blood vessel model is configured such that:
a proximal end of the partial blood vessel model is configured to connect to the biological model connecting portion, and
a distal end of the partial blood vessel model is arranged on at least one of a surface and an inside of the biological model.

7. The human body simulation device according to claim 2, further comprising:
a water bath configured to be filled with a liquid as the fluid and to contain the aorta model and the biological model.

8. The human body simulation device according to claim 1, wherein:
the partial blood vessel model comprises a plurality of blood vessel constituting portions that constitute each portion of the part of blood vessels, and
at least a part of the plurality of blood vessel constituting portions has a lesion portion simulating a lesion inside or outside the blood vessel.

9. The human body simulation device according to claim 1, wherein:
the biological model connecting portion comprises a first flange portion formed on an outer periphery of an opening leading to the inner cavity of the aorta model,
the partial blood vessel model comprises a second flange portion formed on an outer periphery of an opening leading to the inner cavity of the partial blood vessel model, and
the biological model is connectable to the aorta model by fixing the first flange portion and the second flange portion to each other so as to be abutted against each other.

10. The human body simulation device according to claim 9, further comprising:
a fixation member that is configured to fix the first flange portion and the second flange portion to each other by engaging the fixation member to outer edges of the abutted first flange portion and second flange portion.

11. The human body simulation device according to claim 1, wherein the partial blood vessel model is configured such that:
a proximal end of the partial blood vessel model is configured to connect to the biological model connecting portion, and
a distal end of the partial blood vessel model is arranged on at least one of a surface and an inside of the biological model.

12. The human body simulation device according to claim 1, further comprising:
a water bath configured to be filled with a liquid as the fluid and to contain the aorta model and the biological model.

13. The human body simulation device according to claim 1, wherein:
the biological model is a heart model having an inner cavity and simulating a heart,
the human body simulation device further comprises a beat pump configured to cause the heart model to beat by sending and sucking an expansion medium into/from the inner cavity of the heart model, and
the expansion medium is a radiolucent liquid.

* * * * *